United States Patent [19]
Fuller et al.

[11] Patent Number: 5,238,998
[45] Date of Patent: Aug. 24, 1993

[54] TONER AND DEVELOPER COMPOSITIONS WITH LIQUID GLASS RESINS

[75] Inventors: Timothy J. Fuller, W. Henrietta; Samuel Kaplan, Walworth; Michael J. Levy, Webster; Joseph D. Geiser, Rochester; Richard B. Lewis, Williamson; William M. Prest, Jr., Webster, all of N.Y.

[73] Assignee: Xerox Corporation, Stamford, Conn.

[21] Appl. No.: 956,321

[22] Filed: Oct. 5, 1992

Related U.S. Application Data

[62] Division of Ser. No. 587,194, Sep. 24, 1990, Pat. No. 5,158,851.

[51] Int. Cl.$^5$ ............................................. C08L 53/00
[52] U.S. Cl. ...................................... 525/98; 525/911; 525/941; 430/106; 526/340; 585/435; 585/502; 585/507; 585/508; 585/517; 585/601
[58] Field of Search ......................... 525/98, 911, 941; 430/106; 526/340; 585/435, 502, 507, 508, 517, 601

*Primary Examiner*—Maurice J. Welsh
*Attorney, Agent, or Firm*—E. O. Palazzo

[57] ABSTRACT

A toner composition comprised of multiblock or liquid glass resin particles with a glass transition temperature of between from about 20° C. to about 65° C., and pigment particles.

24 Claims, 3 Drawing Sheets

TONER AND DEVELOPER COMPOSITIONS WITH LIQUID GLASS RESINS

This is a continuation division, of application Ser. No. 587,194, filed Sep. 24, 1990, now U.S. Pat. No. 5,158,851.

BACKGROUND OF THE INVENTION

This invention is generally directed to toner compositions, and more specifically, the present invention relates to developer compositions with toner compositions comprised of liquid glass or multiblock resins. More specifically, in one embodiment of the present invention there are provided developer compositions formulated by, for example, admixing toner compositions containing multiblock polymeric toner resins and carrier components. In one embodiment of the present invention there are provided toner compositions with multiblock or liquid glass polymers, such as $(A-B)_n$ wherein n represents the number of repeating polymer segments and where A and B represent monomeric or oligomeric segments, which components possess in an embodiment of the present invention a desirable low fusion and fusing energy; are easily jettable or processable into toner compositions; possess low interfacial surface energies between the polymer segments enabling low temperature fusing; are optically clear, and with the multisegment polymers illustrated herein there can in embodiments be fabricated brittle, rubbery, or other similar toner polymers with an optimized melt viscosity profile, that is for example added segments increase the molecular weight and can increase the melt viscosity of the resulting polymer without substantially adversely influencing the glass transition temperature; and lowering the fusing temperature characteristics of the toner resin. The polymers of the present invention are processable by conventional toner means, that is these materials are extrudable, melt mixable and jettable. The resulting toner materials in an embodiment of the present invention possess excellent triboelectric charging characteristics and also fuse and fix to paper to about 100° F. lower than conventional toner polymers. Also, toner compositions formulated with the aforementioned multisegment polymers have similar advantages as illustrated herein. Thus, for example, the toner compositions in an embodiment of the present invention possess lower fusing temperatures, and therefore lower fusing energies are required for fixing, thus enabling less power consumption during fusing, and permitting extended lifetimes for the fuser systems selected. The toners of the present invention can be fused (fuser roll set temperature) at temperatures of between 220° and 270° F. in an embodiment of the present invention as compared to a number of currently commercially available toners which fuse at temperatures of from about 300° to about 325° F. With further respect to the present invention, the multiblock, or liquid glass polymers contain, for example, in embodiments thereof an oligomeric glassy segment with a glass transition temperature of from about 24° to about 72° C., a degree of polymerization of from about 1 to about 100, while the liquid phase has a degree of polymerization of from about 1 to about 100 or about one third of the molecular weight of the glassy content. When the liquid phase is polybutadiene, the butadiene may be incorporated as 1,4 olefinic cis, trans, or 1,2-vinyl enchainments, and the like. Isoprene behaves similarly. Preferred "nonblocking" properties, that is noncaking or retaining substantially all the properties of a free flowing powder, are obtained with, for example, compositions having a high level of the aforementioned 1,2-vinyl enchainments. In an embodiment the multiblock polymers of the present invention, wherein A can represent the glassy component and B can represent the liquid component, have a number average molecular weight of from about 3,000 to about 100,000 and preferably from about 6,000 to about 50,000. Also, the economical toner and developer compositions of the present invention are particularly useful in electrophotographic imaging and printing systems, including color, especially xerographic imaging processes that are designed for the generation of full color images.

The electrostatographic process, and particularly the xerographic process, is well known. This process involves the formation of an electrostatic latent image on a photoreceptor, followed by development, and subsequent transfer of the image to a suitable substrate. Numerous different types of xerographic imaging processes are known wherein, for example, insulative developer particles of conductive toner compositions are selected depending on the development systems used. Of known value with respect to the aforementioned developer compositions, for example, is the appropriate triboelectric charging values associated therewith as it is these values that can enable continued constant developed images of high quality and excellent resolution; and admixing characteristics. Specifically, thus toner and developer compositions are known, wherein there are selected as the toner resin styrene acrylates, styrene methacrylates, and certain styrene butadienes including those available as Pliolites. Other resins have also been selected for incorporation into toner compositions inclusive of the polyesters as illustrated in U.S. Pat. No. 3,590,000. Moreover, it is known that single component magnetic toners can be formulated with styrene butadiene resins, particularly those resins available as Pliolite. In addition, positively charged toner compositions containing various resins, inclusive of certain styrene butadienes and charge enhancing additives, are known. For example, there are described in U.S. Pat. No. 4,560,635, the disclosure of which is totally incorporated herein by reference, positively charged toner compositions with distearyl dimethyl ammonium methyl sulfate charge enhancing additives. The '635 patent also illustrates the utilization of suspension polymerized styrene butadienes for incorporation into lower compositions, reference for example working Example IX.

In a patentablility search report, the following United States patents were listed:

U.S. Pat. No. 3,965,021 Patentee: Clemens et al. Issued: Jun. 21, 1976

U.S. Pat. No. 3,853,778 Patentee: Buckley et al. Issued: Dec. 4, 1974

U.S. Pat. No. 3,967,962 Patentee: O'Malley Issued: Jul. 6, 1976

U.S. Pat. No. 4,528,257 Patentee: Polderman et al. Issued: Jul. 9, 1985 and noted as background interest U.S. Pat. Nos. 2,940,934; 3,876,610; 3,974,078; 4,262,077; 4,272,600 and 4,385,107.

Clements discloses, for example, a toner resin comprised of a physical blend of incompatible polymers, and a toner in which the resinous material is comprised of at least two polymers, reference for example the Abstract of the Disclosure. The segments of the block copolymers may be polystyrene and polybutadiene. For example, as disclosed in column 3, the polyblends are either graft or block copolymers that have relatively long chains of each polymer component, and therefore each polymeric component retains its own identity. In column 3 of U.S. Pat. No. 3,965,021, there is disclosed a toner comprised of a resinous material of a polyblend of at least two types of polymers, which polyblend may either be a physical mixture, or a chemical mixture of either a block copolymer or a graft copolymer, see lines 28 and 29 of column 3, and note the disclosure in column 3, beginning at line 58; the glass transition information in columns 5 and 6; and the working Examples, including Examples 27 and 28.

Buckley, for example, discloses a toner resin comprised of a polymer selected from the group consisting of a crystalline homopolymer or copolymer having an amorphous backbone and side-chain crystallinity derived from polymerizable monomers having at least 14 carbon atoms, reference for example the Abstract of the Disclosure, note also columns 4, 5 and 6, and the working Examples.

O'Malley discloses, for example, a semicrystalline toner resin comprised of block or graft copolymers consisting of at least one crystalline or crystallizable polymeric segment chemically linked to at least one amorphous polymeric segment, see the Abstract of the Disclosure for example; note also column 4, beginning at line 54, and columns 6 and 7.

Polderman also discloses a semicrystalline toner resin comprised of immisicible crystalline and amorphous polymeric blocks, see for example the Abstract of the Disclosure.

Numerous patents are in existence that illustrate toner compositions with various types of toner resins including, for example, U.S. Pat. Nos. 4,104,066, polycarolactones; 3,547,822, polyesters; 4,049,447, polyesters; 4,007,293, polyvinyl pyridine-polyurethane; 3,967,962, polyhexamethylene sebaccate; 4,314,931, polymethyl methacrylates; Reissue 25,136, polystyrenes; and 4,469,770, styrene butadienes.

In U.S. Pat. No. 4,529,680, there are disclosed magnetic toners for pressure fixation containing methyl-1-pentene as the main component. More specifically, there are illustrated in this patent, reference column 2, beginning at line 66, magnetic toners with polymers containing essentially methyl-1-pentene as the main component, which polymer may be a homopolymer or copolymer with other alpha-olefin components. It is also indicated in column 3, beginning at around line 14, that the intrinsic viscosity of the polymer is of a specific range, and further that the melting point of the polymer is in a range of 150° to 240° C. and preferably 180° to 230° C. Other patents that may be of background interest include U.S. Pat. Nos. 3,720,617; 3,752,666; 3,788,994; 3,983,045; 4,051,077; 4,108,653; 4,258,116; and 4,558,108.

In addition, several patents illustrate toner resins including vinyl polymers, diolefins, and the like, reference for example U.S. Pat. No. 4,560,635. Moreover, there are illustrated in U.S. Pat. No. 4,469,770 toner and developer compositions wherein there are incorporated into the toner styrene butadiene resins prepared by emulsion polymerization process.

Furthermore, a number of different carrier particles have been illustrated in the prior art, reference for example U.S. Pat. No. 3,590,000 mentioned herein; and U.S. Pat. No. 4,233,387, the disclosures of which are totally incorporated herein by reference, wherein coated carrier components for developer mixtures, which are comprised of finely divided toner particles clinging to the surface of the carrier particles, are recited. Specifically, there are disclosed coated carrier particles obtained by mixing carrier core particles of an average diameter of from between about 30 microns to about 1,000 microns with from about 0.05 percent to about 3.0 percent by weight based on the weight of the coated carrier particles of thermoplastic resin particles. More specifically, there are illustrated in the '387 patent processes for the preparation of carrier particles by a powder coating process, and wherein the carrier particles consist of a core with a coating thereover comprised of polymers. The carrier particles selected can be prepared by mixing low density porous magnetic, or magnetically attractable metal core carrier particles with from, for example, between about 0.05 percent and about 3 percent by weight based on the weight of the coated carrier particles of a polymer until adherence thereof to the carrier core by mechanical impaction or electrostatic attraction; heating the mixture of carrier core particles and polymer to a temperature, for example, of between from about 200° F. to about 550° F. for a period of from about 10 minutes to about 60 minutes enabling the polymer to melt and fuse to the carrier core particles; cooling the coated carrier particles; and thereafter classifying the obtained carrier particles to a desired particle size. In U.S. Pat. Nos. 4,937,166 and 4,935,326, the disclosures of which are totally incorporated herein by reference, there are illustrated, for example, carrier particles comprised of a core with a coating thereover comprised of a mixture of a first dry polymer component and a second dry polymer component not in close proximity to the first polymer in the triboelectric series. Therefore, the aforementioned carrier compositions can be comprised of known core materials including iron with a dry polymer coating mixture thereover. Subsequently, developer compositions can be generated by admixing the aforementioned carrier particles with a toner composition comprised of resin particles and pigment particles. Other patents include U.S. Pat. No. 3,939,086, which teaches steel carrier beads with polyethylene coatings, see column 6; U.S. Pat. No. 3,533,835; 3,658,500; 3,798,167, 3,918,968, 3,922,382; 4,238,558; 4,310,611; 4,397,935 and 4,434,220.

In copending application U.S. Ser. No. 751,922, now abandoned, entitled Developer Compositions With Specific Carrier Particle Developers, the disclosure of which is totally incorporated herein by reference there are illustrated toners with styrene butadiene copolymers, pigment particles inclusive of magnetites, charge controlled additives, and carrier particles containing a core with a coating thereover of vinyl copolymers, or homopolymers, such as vinyl chloride/vinyl acetate.

Semicrystaline polyolefin resins or blends thereof are illustrated in U.S. Pat. No. 4,490,424 and U.S. Pat. No. 4,952,477, the disclosures of which are totally incorporated herein by reference. More specifically, in U.S. Pat. No. 4,952,477 there are disclosed toners with semicrystalline polyolefin polymer or polymers with a melting point of from about 50 to about 100° C., and preferably from about 60° to about 80° C. with the following formulas wherein x is a number of from about 250 to about 21,000; the number average molecular weight is from about 17,500 to about 1,500,000 as determined by GPC; and the $M_w/M_n$ dispersity ratio is from about 2 to about 15.

I. Polypentenes-$(C_5H_{10})_x$
II. Polytetradecenes-$(C_{14}H_{28})_x$
III. Polypentadecenes-$(C_{15}H_{30})_x$
IV. Polyhexadecenes-$(C_{16}H_{32})_x$
V. Polyheptadecenes-$(C_{17}H_{34})_x$
VI. Polyoctadecenes-$(C_{18}H_{36})_x$
VII. Polynonadecenes-$(C_{19}H_{38})_x$; and
VIII. Polyeicosenes-$(C_{20}H_{40})_x$.

Examples of specific semicrystalline polyolefin polymers illustrated in this copending application include poly-1-pentene; poly-1-tetradecene; poly-1-pentadecene; poly-1-hexadecene; poly-1-heptadence; poly-1-octadene; poly-1-nonadecene; poly-1-eicosene; mixtures thereof; and the like.

Although the above described toner compositions and resins are suitable for their intended purposes, especially those of U.S. Pat. No. 4,952,477 and U.S. Pat. No. 4,490,424 in most instances, there continues to be a need for toner and developer compositions containing new resins. More specifically, there is a need for toners which can be fused at lower energies than many of the presently available resins selected for toners but which retain many or all of the same desirable physical properties, for example, hardness, processibility, durability, and the like. There is also a need for resins that can be selected for toner compositions which are low cost, nontoxic, nonblocking at temperatures of less than 50° C., jettable, melt fusible with a broad fusing latitude, cohesive above the melting temperature, and triboelectrically chargeable. In addition, there remains a need for toner compositions, especially low melt toners, which can be fused at low temperatures, that is for example 260° F. or less, as compared to a number presently in commercial use, which require fusing temperatures of about 300° to 325° F., thereby enabling with the compositions of the present invention the utilization of lower fusing temperatures, and lower fusing energies permitting less power consumption during fusing, and allowing the fuser system, particularly the fuser roll selected, to possess extended lifetimes. Another need resides in the provision of developer compositions comprised of the toner compositions illustrated herein, and carrier particles. There also remains a need for toner and developer compositions containing additives therein, for example charge enhancing components, thereby providing positively or negatively charged toner compositions. Furthermore, there is a need for toner and developer compositions with multiblock polymers that will enable the generation of solid image area with substantially no background deposits, and full gray scale production of half tone images in electrophotographic imaging and printing systems.

There is also a need for multiblock polymers and copolymers thereof, and mixtures of the aforementioned polymers and copolymers with glass transition temperatures of, for example, from about 20° to about 70° C., and preferably from about 33° to about 60° C.; and wherein toner compositions containing the aforementioned resins can be formulated into developer compositions which are useful in electrophotographic imaging and printing systems, and wherein fusing can, for example, be accomplished by flash, radiant, with heated ovens, cold pressure, and heated roller fixing methods, in embodiments of the present invention.

SUMMARY OF THE INVENTION

It is an object of the present invention to provide toner and developer compositions which possess many of the advantages illustrated herein.

In another object of the present invention there are provided developer compositions with positively charged toners containing therein multiblock or liquid glass resins.

Also, in another object of the present invention there are provided toner compositions, containing therein a multiblock polymer as resinous components, which components have glass transition temperatures of from about 24° to about 72° C., and preferably from about 33° to about 60° C.

Further, in an additional object of the present invention there are provided developer compositions comprised of toners having incorporated therein multiblock resins, and carrier particles.

Furthermore, in another object of the present invention there are provided improved toner compositions which are can be fused at low temperatures thereby reducing the amount of energy needed for affecting fusing of the image developed.

Moreover, in another object of the present invention there are provided developers with positively charged toner compositions that possess excellent electrical properties.

Also, in another object of the present invention there are provided developers with stable triboelectric charging characteristics for extended time periods exceeding, for example, 1,000,000 imaging cycles.

Another object of the present invention residues in the provision of toner compositions with excellent blocking temperatures, and acceptable fusing temperature latitudes.

In another object of the present invention there are provided toner and developer compositions that are nontoxic, nonblocking at temperatures of less than 50° F. jettable, melt fusible with a broad fusing latitude, and cohesive above the melting temperature thereof.

Furthermore, in an additional object of the present invention there are provided developer compositions containing a carrier particles with a coating thereover comprised of a mixture of polymers that are not in close proximity in the triboelectric series, reference U.S. Pat. No. 4,937,166, and 4,935,326, the disclosures of which are totally incorporated herein by reference.

Also, in yet still another object of the present invention there are provided methods for the development of electrostatic latent images with toner compositions containing therein multiblock amorphous polymers as resin particles.

In yet another object of the present invention there are provided developer compositions with carrier components obtained by a dry coating process, which particles possess substantially constant conductivity parameters, and a wide range of preselected triboelectric charging values.

Furthermore, in yet a further object of the present invention there are provided developer compositions with carrier particles comprised of a coating with a mixture of polymers that are not in close proximity, that is for example a mixture of polymers from different positions in the triboelectric series, and wherein the toner compositions incorporated therein possess excellent admix charging values of, for example, less than one minute, and triboelectric charges thereon of from about 10 to about 40 microcoulombs per gram.

Another object of the present invention resides in the provision of toner and developer compositions which are insensitive to humidity of from about 20 to about 90 percent, and which compositions possess superior aging characteristic enabling their utilization for a substantial number of imaging cycles, exceeding 500,000 in some embodiments, with very little modification of the triboelectric properties, and other characteristics.

Also, in another object of the present invention there are provided low melting toner compositions.

In still another object of the present invention there are provided toner and developer compositions for affecting development of images in electrophotographic imaging apparatus, including xerographic imaging and printing processes.

Still another object of the present invention is to provide toner polymers which pass blocking test requirements above the glass transition temperature of the polymer.

These and other objects can be accomplished in embodiments of the present invention by providing toner and developer compositions comprised of multiblock or liquid glass polymers. More specifically, in one embodiment of the present invention there are provided toner compositions comprised of pigment particles and amorphous multiblock polymers. The aforementioned multiblock polymers in embodiments of the present invention possess a glass transition temperature of from about 24° to about 70° C., and preferably from about 33° to about 60° C. as determined by DSC (different scanning calorimetry) are preferred.

More specifically, in one embodiment the multiblock polymers of the present invention are of the formula (A—B)$_n$ wherein n represents the number of A of B repeat segments and where A and B represent monomeric or oligomeric segments. The number of A and B repeat polymer segments n, in embodiments of the present invention, is about 2 to about 100, and preferably from about 3 to about 35. Accordingly, the multiblock polymers of the present invention usually contain at least two A segments, and at least one B segment, and up to 100 A and 100 B segments. The number average molecular weight of the multiblock polymers of the present invention depends on the number of A and B segments, the toner properties desired, and the like; generally, however, the number average molecular weight is from about 3,000 to about 100,000 and preferably from about 6,000 to about 50,000. In another embodiment of the present invention, the multiblock polymers are comprised of a glass phase A of, for example, a number of polystyrene segments, and a liquid phase B with, for example, a number of polydiene derived segments, such as polybutadiene. A polystyrene content of between about 70 to about 100 percent by weight of the glassy component is preferred embodiments of the present invention. A polybutadiene content of between about 15 to about 100 percent by weight of the liquid component is preferred in an embodiment of the present invention. The total butadiene content of the liquid glass resins is between 15 to about 40 percent by weight and the total polystyrene of the liquid glass resins is, for example, between about 60 to about 85 percent by weight. The preferred enchainment of polybutadiene and other polymerized 1,4 dienes in the liquid component in an embodiment of the present invention is the 1,2-vinyl regioisomer of between about 80 to about 90 percent and the 1,4-cis and trans regioisomers of between about 10 to about 20 percent by weight of the total enchained butadiene. Thus, in one embodiment multiblock polymers containing liquid component polybutadiene segments having high 1,2-vinyl butadiene regioisomer enchainments are selected.

The multiblocks polymers of liquid glass resins of the present invention in embodiments thereof satisfy the criteria of the known blocking test (anti-caking property) above their glass transition temperatures. For example, several multiblock polymers of the present invention have glass transition temperatures near 50° C. and acceptable blocking at 130° F. (54° C.). The blocking test can be accomplished by placing a toner powder sample prepared from the liquid glass resin into a convection oven according to the sequence of one day (24 hours) at 115° F., a second day at 120° F., and a third day at 125° F. The prepared toner samples had excellent powder flow properties and were free flowing or only slightly caked, but easily friable powder was present after incubation periods.

DESCRIPTION OF EMBODIMENTS OF THE PRESENT INVENTION

Examples of multiblock polymers of the present invention include those as illustrated herein, wherein the glass component A represents one oligomeric segment such as polystyrene, poly-alpha-methyl styrene, and the like, and wherein the liquid component B represents another oligomeric segment, such as polybutadiene, polyisoprene, hydrogenated polybutadiene, hydrogenated polyisoprene, halogenated polybutadiene, halogenated polyisoprene, low molecular weight segments of polyethylene comparable in length to the aforementioned hydrogenated polyolefins, and the like. Examples of polymers include:

1. multiblock polymers of the formula

Figure 1:
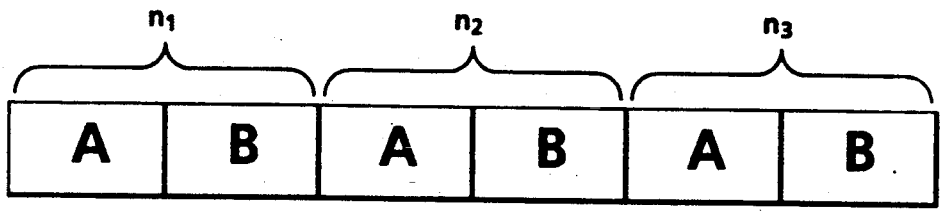
FIGS. 1, 2, 3a, 3b, 4, and 5 represent toner polymer examples of the present invention with, for example, specific polymers also being provided.

wherein n is a number of from 2 to about 100; for example, where n=3 as shown in FIG. 1;

2. glassy terminal multiblock polymers of the formula

Figure 2:
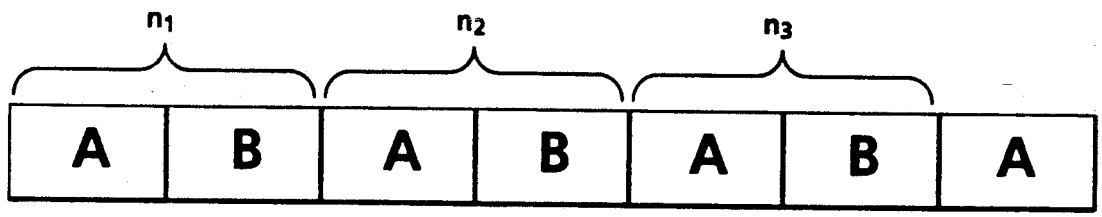

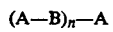

wherein n is a number of from 1 to about 100, and wherein both ends of the polymer chain are terminated with a glassy component A; for example, where n=3, as shown in FIG. 2;

3. glassy terminal graded multiblock polymers of the formula

Figure 3A:
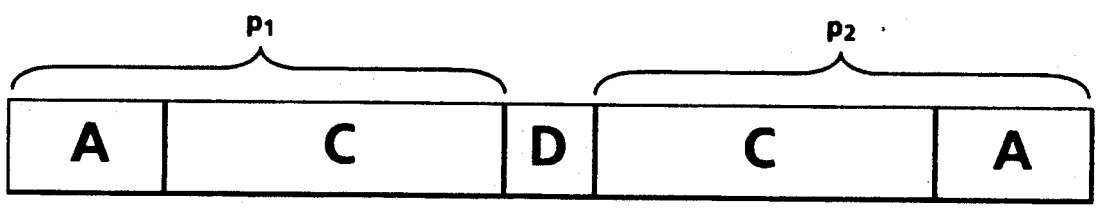
Figure 3B:
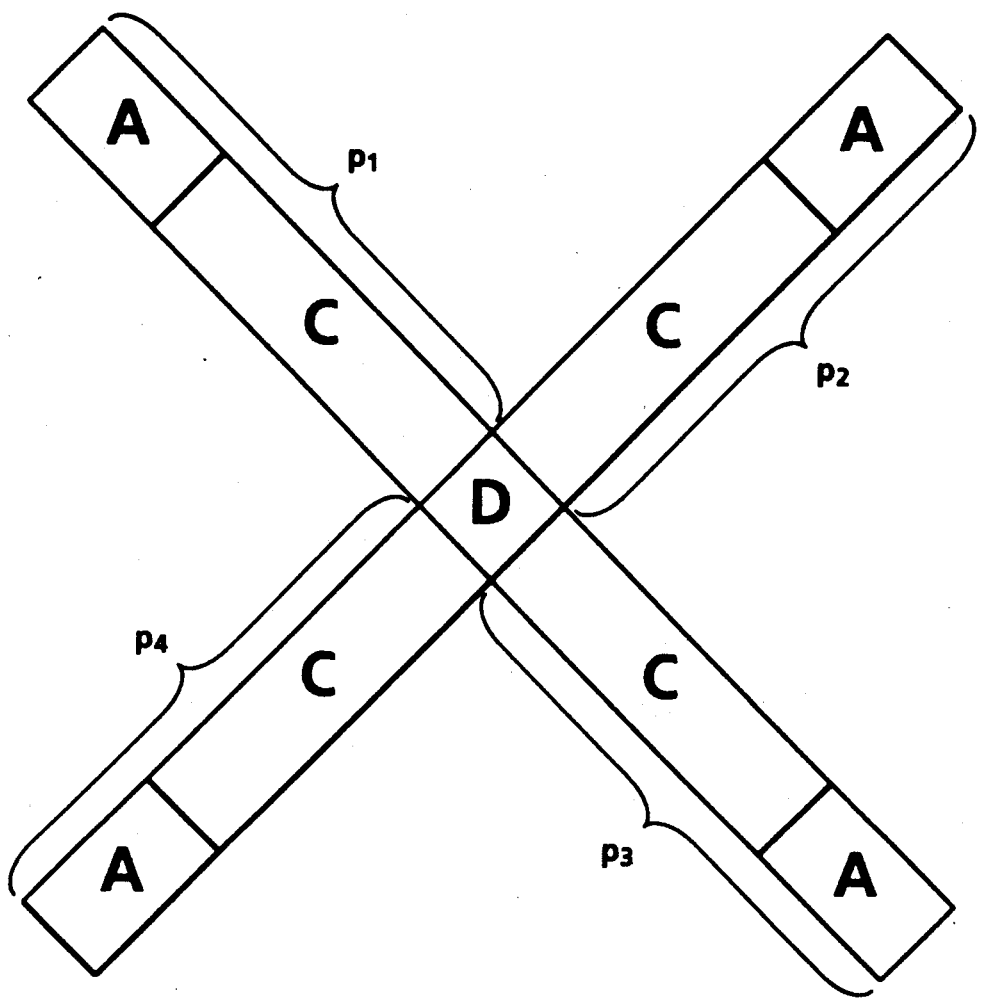

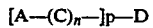

wherein n is a number of from 1 to about 50, p is a number of from 1 to 4 that represents the number of arms that extend radially, D is the point of initiation, that is the singular molecule structural component representing the initiation site, for example the reaction product of diisopropenyl benzene and butyl lithium, (C) represents graded or gradient block domains composed of from 3 monomers to about 350 monomers that become progressively enriched in the number of glassy A segments and depleted in the number of liquid B segments as the chain extends away from the point of initiation, that is the number of A blocks is farther away or remote from (distal) the initiation site D, and the number of B blocks is greater proximal to the initiation site D; for example, where n=1, p=2 as shown in FIG. 3a; for example, where n=1, p=4 as shown in FIG. 3b;

4. glassy terminal graded segmented multiblock polymers of the formula

Figure 4:
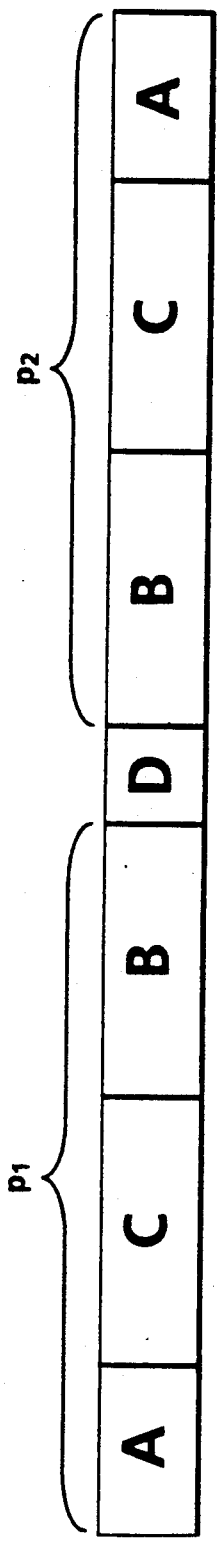

[A—(C)$_n$—(B)m—]p—D wherein n is a number of from 1 to about 50, m is a number of from 1 to about 25, (B) represents regions of essentially all liquid B component spacer segment, and (C), D and p are as illustrated in 3 above; for example where n =1, m=2 as shown in FIG. 4;

5. glassy terminal graded multi-segmented multiblock polymers of the formula

Figure 5:
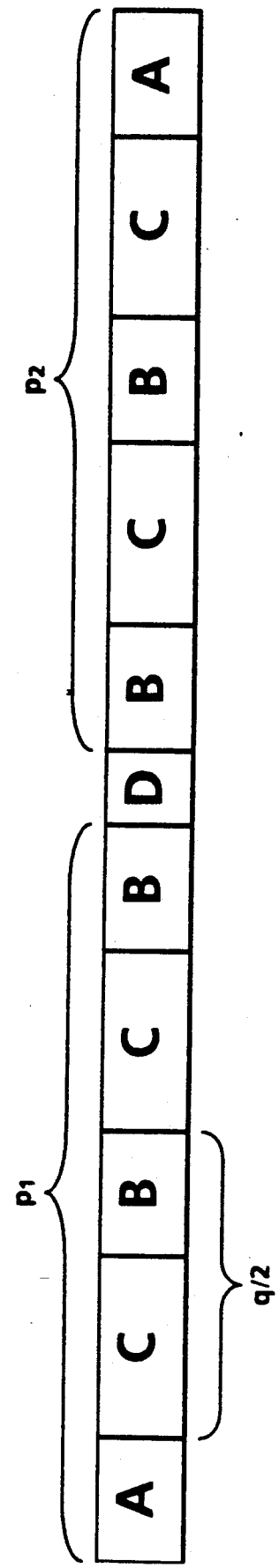

[A—{—(C)n—(B)m—}q—]p—D wherein n is a number of from 1 to about 50, m is a number of from 1 to about 25, q is a number from 1 to 50 that represents the number of linearly repeated segments of the multiblock segment combination, —(C-)$_n$—(B)$_m$— contained in the curly brackets, and (C), D and p are as specified in 3 and 4 above; for example where n=1, m=1, p=2, q=2 as shown in FIG. 5;

6. ionizable terminal multiblock polymers of the formula

Y—Z—Y or Z—Y wherein the liquid glass polymer chain end groups are modified so as to terminate in Y groups on one or more ends of the polymer chain that are capable of ionization and hydrogen bonding, for example the hydroxyl, —OH, or carboxyl, —CO$_2$H, radicals and their corresponding metal salts, for example lithium, sodium, potassium, magnesium, aluminum and the like, and wherein Z represents a multiblock polymer selected from and defined by the aforementioned Types 1 through 5. Specifically, Type 6 compounds are obtained by quenching and, therefore, terminating the reaction mixture described for the preparation of the aforementioned resin Types 1 through 5 with, for example, carbon dioxide, hydrolizable carbonates and acid chlorides, and the like, or various epoxide containing compounds;

7. hydrogenated derivatives of Types 1 to 6 above, examples of which are prepared by anionic polymerization followed by catalytic hydrogentation; and 8. halogenated derivatives of Types 1 to 6 above, examples of which are prepared by anionic polymerization followed by stoichiometric halogenation of the 1,4-olefinic and 1,2-vinylic double bonds with, for example, liquid bromine or dissolved gaseous chlorine.

The multiblock liquid glass resins can be represented by the following formulas wherein the substituents are as indicated herein: Type 1 (A—B)$_n$ multiblock polymers wherein the polymer chain contains at least two alternating blocks or segments of polystyrene; Type 2 (A—B)$_n$—A glassy terminal multiblock polymers, that is the multiblock polymers of 1 that are terminated on both ends of the polymer chain with glassy A regions; Type 3 [A—(C)n—]p—D glassy terminal graded multiblock polymers, that is gradient multiblock polymers that are end terminated with glassy A regions, which materials are typically prepared in a single one pot reaction; Type 4[A—(C)n—(B)m—]p—D glassy terminal graded segmented multiblock polymers, that is gradient multiblock polymers that are terminated with glassy A regions, and additionally have a region of essentially all liquid B component segments separating the graded multiblock domains, these materials are prepared in multiple addition step reactions often in a single pot; and Type 5[A—{—(C)n—(B)m—}q—]p—D glassy terminal graded multi-segmented multiblock polymers, that is gradient multiblock polymers that are terminated with glassy A regions, and additionally have multiple regions of essentially all liquid B component segments separating a plurality of graded multiblock C domains, further the individual graded C segments within the contiguous polymer chain contain local termi that are essentially all glassy A regions.

In embodiments, preferred liquid glass polymer structures are of Type 3, and particularly preferred are Types 4 and 5. Liquid glass polymers of Type 3 are preferred, for example, since their preparation is simple, that is a one pot synthesis requiring a singe step, while structures of Types 4 and 5, although less convenient to prepare, are particularly preferred because of their superior performance characteristics such as lowered minimum fix temperature and elevated hot offset temperature properties in embodiments of the present invention.

Specific examples of multiblock polymers include polystrene glass-polybutadiene liquid-polystyrene glass with a number average molecular weight of from about 3,000 to about 70,000; polystrene glass-polyisoprene liquid-polystrene glass with a number average molecular weight of from about 5,000 to about 70,000; hydrogenated (polystrene glass-polybutadiene liquid-polystrene glass) with a number average molecular weight of from about 4,000 to about 70,000; hydrogenated (polystrene glass-polyisoprene liquid-polystyrene glass) with a number average molecular weight of from about 4,000 to about 70,000; ionizable polystyrene glass-polybutadiene liquid-polystyrene glass with a number average molecular weight of from about 3,000 to about 60,000; ionizable polystyrene glass-polybutadiene liquid-polystyrene glass with a number average molecular weight of from about 3,000 to about 60,000; halogenated, especially chlorinated (polystyrene glass-polybutadiene liquid-polystyrene glass) with a number average molecular weight of from about 3,000 to about 100,000; and halogenated, especially chlorinated (polystyrene glass-polyisoprene liquid-polystyrene glass) with a number average molecular weight of from about 3,000 to about 100,000.

In embodiments, the phrase "liquid glass" resins is intended to illustrate the physical and mechanical properties of the material, which is analogous to liquid crystalline polymers that exhibit certain concurrent physical properties that are at once characteristic to both the liquid state and crystalline solid state. Similarly, semi-crystalline resins have structures that contain both crystalline and amorphous regions in the same polymer molecule.

While not being desired to be limited by theory, it is believed that the combination of crystalline regions and amorphous region in the same molecule imparts upon the resin product certain physical and mechanical properties that are unlike either purely crystalline or amorphous resins, and different physical and mechanical properties from a simple physical blend of like proportions of the pure materials. That is, by selectively constructing specific molecular architectures, for example by controlling the degree of blockedness or randomness, the chemical composition, the regiochemistry of the diene monomer reaction, chemistry of the end groups, and the size of the blocks, it is possible to obtain resin products with unique and useful rheological properties in an embodiment of the present invention as indicated herein. Although not limited by theory, it is believed that the unique properties of the liquid glass resins described herein derive from the unencumbered intra- and intermolecular interaction and mixing of the liquid and glass component microdomains.

Liquid of the "liquid glass" resin refers to, for example, an oligomer or polymer segment that is above its glass transition point and exhibits properties characteristic of a melted glass or molten solid in flowability, pourability and conforms closely to the dimensions of containment. The word "glass" in "liquid glass" refers to, for example, a polymer or polymer segment that is below its glass transition point and exhibits properties characteristic of a supercooled liquid, such as being an amorphous solid of high hardness, of high optical clarity, easily liquified upon heating, and is friable as, for example, polystyrene or common inorganic silicate glasses.

Although not desired to be limited by theory and while other meanings of the term liquid glass could be envisioned, the properties of the liquid glass multiblock polymers are believed to be distinct from the other well known polymer classes such as crystalline, semicrystalline, liquid crystalline, and amorphous materials as summarized in the following references, the disclosures of which are totally incorporated herein by reference: *Macromolecules*, second edition, Vol. 1, by Hans-Georg Elias, Plenum Press, N.Y. 1984; *Textbook of Polymer Science*, second edition, by Fred W. Billmeyer, Jr., Wiley-Interscience, N.Y. 1971; and *Block Polymers*, Ed. S. L. Aggarwal, Plenum Press, N.Y. 1970.

Typical properties of crystalline polymers include a highly ordered solid state, cloudy appearance, sharp melting points, and high heats required for melting and properly fixing toner images to paper. Semicrystalline polymers usually have high melting points and heats for fixing images to paper, low optical clarity and are less crystalline compared to the aforementioned crystalline polymers. The liquid crystalline polymers are usually cloudy in appearance, have broad melting transitions and not glass transitions, and are more highly ordered than liquid glass polymers. The amorphous polymer materials usually tend to be clear, possess no long or short range solid state order and have low glass transition temperatures. The liquid glass polymers of the present invention in embodiment theory. it is believed, exhibit a very limited amount of solid state order, that is intermediate between the aforementioned randomly ordered amorphous polymers and the semicrystalline polymers.

Anionic polymerization of styrene and butadiene allows for the preparation of random, block or multiblock copolymers with precise control of molecular weight, stereochemistry of the diene component, and monomer content and sequence. This high degree of architectural control is made possible since, for example, anionic polymerization conditions generate "living" polymers wherein the styrene and butadiene may be interchanged during the polymerization process by the operator. Hence, unique A—B type multiblock polymer compositions may be prepared as illustrated herein.

Generally, the multiblock polymers of the present invention in embodiments thereof are prepared by first generating an appropriate anionic initiator. This can be achieved by combining lithium metal or an organolithium compound, for example alkyl lithium compounds, with, for example, an alkyl group of from 1 to about 20 carbon atoms such as methyl, ethyl, propyl, butyl, pentyl, hexyl, octyl, nonyl, decyl, dodecyl and the like, or aryllithium compounds with, for example, an aryl group of from 6 to about 24 carbons such as phenyl, naphthyl, and the like, with a vinyl substituted aromatic compound containing at least one and preferably two or more reactive double bonds, or an aromatic compound containing active hydrogens, that is acidic hydrogens that will be metallated in the presence of the lithium metal, or the lithium compound. Preferred examples of alkyl lithium or aryl lithium compounds include butyl lithiums such as n-butyl lithium and sec-butyl lithium and phenyl lithium, and the like. Preferred examples of vinyl substituted aromatic compounds containing at least one and preferably two or more reactive double bonds are styrene, alphamethylstyrene, diisopropenyl benzene, triisopropenyl benzene, tetraisopropenyl benzene, and the like. Preferred examples of aromatic compounds containing active methylene groups are tetraphenyl ethane, tetraphenyl butane, tetraphenyl hexane, bis(diphenyl propyl) ether, and the like. Preferred examples of aromatic compounds containing active hydrogens are, for example, naphthalene, anthracene, phenanthracene and the like.

The alkyl lithium or aryl lithium compound can be added in an appropriate stoichiometry such that the molar equivalents of lithium compound are equal to the number of reactive double bond equivalents or active hydrogen equivalents contained in the vinyl substituted aromatic compound or active hydrogen containing aromatic compound, respectively. With the initiator thus formed in situ, as evidenced, for example, by an intense red color indicative of the presence of reactive vinyl substituted aromatic anion species, the cooled reaction mixture is treated with a single solution containing both monomer reactions, simultaneously or sequentially with solutions containing the separated reactant monomers, for example styrene and butadiene. The solvents employed can be comprised of mixtures of polar aprotic, for example tetrahydrofuran, diethyl ethers and dimethoxy ethane, and nonpolar aprotics, for example cyclohexane or hexanes. The order of addition of the reactants, the rate of addition, the time interval between sequential additions, and relative reaction ratio of reactant monomers, that is the relative rate at which the reactants react with the initiator or the growing polymer chain can determine the discrete architectural structure of the final isolated multiblock polymer products. Examples of the aforementioned include Types 1 through 5 described above.

The molar equivalent ratio of reactive monomers that enables multiblocks of the type A and B range in embodiments of the present invention from about 10 to 1 to about 1 to 10 depending, for example, upon the rheological properties desired in the final product resin. A reactive monomer molar equivalent ratio of A to B of from about 5 to 1 to about 1 to 5 is preferred and a molar equivalent ratio of 2 to 1 to about 1 to 2 is more preferred. The amount of initiator employed in the reactions is a minor amount relative to the reactive monomer. Typical molar equivalent ratios of initiator to reactive monomer are from about 1 to 10 to about 1 to 100, a ratio of about 1 to 50 to about 1 to 70 being preferred. Formation of the active initiator can be performed at about room temperature and above depending on the reactivity of the reagents, for example a temperature of between about 10° C. and about 100° C., and preferred temperatures of between about 25° C. and about 75° C. The polymerization reactions, that is the reaction of monomers with the initiators and subsequently reaction of the monomers with the growing polymer chain is dependent upon the desired regiochemistry of the product. If, the example, cyclohexane solvent is used exclusively in the reaction, a high 1,4-olefinic butadiene regiomer content is obtained under conditions requiring 0° to 100° C., and preferably 50° C., and about for hours reaction time. High 1,2 butadiene regioisomer enchainments are achieved by carrying out reactions at low temperatures in the range of −100° C. to about 25° C., and preferably −20° C., to moderate the rate of reaction, the ordering of reactants and the exothermicity of the reaction. The completed reaction mixture, as indicated by the reappearance of a persistent "living anion" color after all scheduled additions of reactants are accomplished, is allowed to warm to room temperature slowly over several hours then quenched with the addition of polar protic solvents such as methanol. The "living anion" color is dependant upon the predominant terminal anionic species in the polymer chain, for example the terminal 1,4 butadiene regioisomer anion is straw yellow color, the 1,2 butadiene regioisomer anion is a muddy brown color, and the styrene anion is red. The color and regioselectivity of the butadiene regioisomers are dependent upon the solvation of the anionic species and ion pairing phenomena. Optionally, with Type 6 liquid glass resins, the reaction mixture is first quenched with a reactive but nonpolymerizable species before the aforementioned protic solvent quench. The products are isolated in nearly quantitative yields based on the weight of total monomer A and B added to the reaction mixture, and are purified as necessary by repeated washing, dissolution and reprecipitation. The multiblock polymer products are identified and characterized using standard methods, many of which are common to modern polymer technology practice as described in the aforementioned published polymer references and which become evident from reading the working Examples.

In another embodiment, the aforementioned liquid glass resin Types 1 through 6 may be catalytically hydrogenated, partially or exhaustively, to convert olefinic double bonds in the polymer chain backbone and pendant groups into the corresponding saturated hydrocarbon functionality. In many instances, hydrogenation of liquid glass resins can provide further control of the variety of rheological properties that may be obtained from multiblock polymer resins. Hydrogenation of liquid glass resin Types 1 through 6 produces the aforementioned liquid glass resins of Type 7. Hydrogenation is accomplished with a solution of the multiblock polymer in contact with an effective amount, for example from about 10 to about 25 percent, of hydrogen gas under pressure in the presence of an appropriate catalyst, for example the known Wilkinson's catalyst.

In another embodiment, the aforementioned liquid glass resin Types 1 through 6 may be halogenated, partially or exhaustively, to convert olefinic double bonds in the polymer chain backbone and pendant groups into the corresponding halogenated hydrocarbon functionality. In many instances, halogenation of liquid glass resins affords further control of the variety of rheological properties that may be obtained from multiblock polymer resins. Halogenation of liquid glass resin Types 1 through 6 produces the aforementioned liquid glass resins of Type 8. Halogenation is accomplished with a solution of the multiblock polymer in contact with an effective amount of from 0.1 to about 5 double bond molar equivalents of halogen gas or liquid dissolved in an organic solvent, for example chlorine gas or liquid bromine dissolved in carbon tetrachloride under slight negative pressure.

The number of blocks contained in the multiblock polymer resins of the present invention may be determined as illustrated, for example, from the formulas, reference FIG. 1 for example, wherein n=the number of repeated and essentially continuous diblock (A—B) polymer or (C) segments, m=(equals) the number of repeated and essentially continuous B segments, p=the number of polymer arms or chains that extend from the initiator site, that is the number of reactive sites on the initiator, for example diisopropenyl has two reactive olefin sites and leads to a polymer that propagates bidirectionally affording a product containing two arms, therefore p is equal to 2.

When p=1, a multiblock polymer is formed in a unidirectional addition process affording a single linear chain product;

when p=2, there is provided a multiblock polymer that is formed in a bidirectional addition process affording also a single linear chain product;

p=3 is a multiblock polymer that is formed in a tridirectional addition process affording a product containing a single branching point and three arms; and p=4 is a multiblock polymer that is formed in a tetradirectional addition process affording a product containing a single branching point having four arms.

The letter q equals the number of operator controlled additions of either the glassy A component monomer or the liquid B component monomer. The letter q' equals the number of operator controlled additions of a mixture of both the glassy A component monomer and the liquid B component monomer.

The addition of glassy A component monomer or the liquid B component monomer to the reaction mixture leads to the formation of one or more blocks of A or B, respectively, depending upon the number of points of initiation p.

The addition of a single solution containing a mixture of both the glassy A component monomer and the liquid B component monomer, referred to by the aforementioned q', leads to the formation of two times the number of blocks, that is q'×2. In general, the B component diene monomer is chosen such that it initially reacts faster and in preference to the glassy A component monomer contained in the mixture. The resulting polymer extension is essentially a diblock addition of the form, D—B—C, to each initiation or chain propagation site wherein B is essentially an all B liquid component block and C is the aforementioned graded (A—B) block. The addition of polar aprotic solvents, for example tetrahydrofuran or diethyl ether, results in graded C blocks.

In the formulas illustrating the multiblock polymers, the letter D representing the point of initiation is not considered as a block since it is but a single molecule and is not counted in calculating the total number of blocks in the multiblock polymer. Similarly, the initially formed polymeric block or blocks are essentially continuous, and optionally branching as defined by the letter p, except for the articulation by the aforementioned single initiator molecule. Therefore, the originating section of the polymer, that is the initiator and the first added polymeric extension or extensions are considered as a single block in determining the total number of blocks in the multiblock and leads to a $(p-1)$ term in calculating the number of blocks. Furthermore, although explicitly shown in the Figures for clarity the terminal A blocks in liquid glass resin Types 3, 4, 5, 6 and Type 7 that are derived from hydrogenating resins Types 3, 4, 5 or 6 need not be counted in the total number of blocks since they are considered to be part of and a consequence of forming all graded, (A—B) blocks.

The formulas below may be used to determine the number of blocks contained in each of the liquid glass resin types described above for embodiments thereof.

| Type 1 and Type 2: | |
|---|---|
| Embodiment 1: $(A\text{-}B)_n$ | #blocks = $(p \times q) - (p - 1)$ |
| Embodiment 2: $(C\text{-}B)_n$ | #blocks = $(p \times q' \times 2) - (p - 1)$ |
| Type 3: | |
| $[A\text{-}(C)_n\text{-}]_p\text{-}D$ | #blocks = $(p \times 2) - (p - 1)$ and $q' = 1$ |
| Type 4: | |
| $[A\text{-}(C)_n\text{-}(B)_m\text{-}]_p\text{-}D$ | #blocks = $(p \times q' \times 2) - (p - 1)$ for $q' = 1$ |
| Type 5: | |
| $[A\text{-}\{\text{-}(C)_n\text{-}(B)_m\text{-}\}_{q'}\text{-}]_p\text{-}D$ | #blocks = $(p \times q' \times 2) - (p - 1)$ |
| Type 6: | |
| Y-Z-Y or Z-Y | #blocks = $Z + p$ | wherein Z is taken from the formula(s) for calculating the number blocks in multiblock polymers of Types 1 to 5 above to the extent that the derivatization reaction does not afford a substantially longer polymer chain than the parent Z polymer. That is, for example, unless the derivatization reaction provides a new block or blocks having molecular weights that are comparable to the molecular weight of the blocks in the parent polymer chain this formula does not usually apply. Instead, the formulas used for the parent compound Types 1 through 6 apply. Similarly, for hydrogenated materials of Type 7 and Type 8, the formula used in calculating the number of blocks in the polymer is the formula used for the parent compound prior to hydrogenation or halogenation, respectively.

The multiblock polymers of the present invention usually consume less energy in attaching the toner to a substrate, that is for example their heat of fusion is usually less than the semicrystalline polymers, a high heat of fusion being about 250 joules/gram; and the heat of fusion being the amount of heat needed to effectively and permanently fuse the toner composition to a supporting substrate such as paper. The multiblock polymers of the present invention also consume less energy because the processing characteristics of the toner polymers are sufficiently brittle so as to facilitate micronization, jetting and classification of the bulk toner composition to particles of appropriate functional toner dimensions. In addition, the aforementioned polymers generally possses a number average molecular weight of from about 3,000 to about 70,000, and have a dispersity $M_w/M_n$ ratio of about 1.2 to about 5 and preferably about 2.

The aforementioned toner resin multiblock polymers are generally present in the toner composition in various effective amounts depending, for example, on the amount of the other components, and the like. Generally, from about 70 to about 95 percent by weight of the multiblock resin is present, and preferably from about 80 to about 90 percent by weight.

Numerous well known suitable pigments or dyes can be selected as the colorant for the toner particles including, for example, carbon black available from Cabot Corporation, nigrosine dye, lamp black, iron oxides, magnetites, and mixtures thereof. The pigment, which is preferably carbon black, should be present in a sufficient amount to render the toner composition highly colored. Thus, the pigment particles are present in amounts of from about 2 percent by weight to about 20 percent, and preferably from about 2 to about 10 weight percent based on the total weight of the toner composition, however, lesser or greater amounts of pigment particles may be selected in some embodiments of the present invention.

Various magnetites, which are comprised of a mixture of iron oxides ($FeO \cdot Fe_2O_3$) in most situations including those commercially available such as Mapico Black, can be selected for incorporation into the toner compositions illustrated herein. The aforementioned pigment particles are present in various effective amounts; generally, however, they are present in the toner composition in an amount of from about 10 percent by weight to about 30 percent by weight, and preferably in an amount of from about 16 percent by weight to about 19 percent by weight. Other magnetites not specifically disclosed herein may be selected.

A number of different charge enhancing additives may be selected for incorporation into the bulk toner, or onto the surface of the toner compositions of the present invention to enable these compositions to acquire a positive charge thereon of from, for example, about 10 to about 35 microcoulombs per gram as determined by the known Faraday Cage method for example. Examples of charge enhancing additives include alkyl pyridinium halides, including cetyl pyridinium chloride, reference U.S. Pat. No. 4,298,672, the disclosure of which is totally incorporated herein by reference, organic sulfate or sulfonate compositions, reference U.S. Pat. No. 4,338,390, the disclosure of which is totally incorporated herein by reference, distearyl dimethyl ammonium methyl sulfate, reference U.S. Pat. No. 4,560,635, the disclosure of which is total incorporated herein by reference; and other similar known charge enhancing additives, such as distearyl dimethyl ammonium bisulfate, and the like, as well as mixtures thereof in some embodiments. These additives are usually present in an amount of from about 0.1 percent by weight to about 15 percent by weight, and preferably these additives are present in an amount of from about 0.2 percent by weight to about 5 percent by weight. A number of different charge enhancing additives may be selected for incorporation into the bulk toner, or onto the surface of the toner compositions of the present invention to enable these compositions to acquire a negative charge thereon of from, for example, about $-10$ to about $-35$ microcoulombs per gram. Examples of negative charge enhancing additives include alkali metal aryl borate salts, for example potassium tetraphenyl borate, reference U.S. Pat. No. 4,767,688 and U.S. Pat. No. 4,898,802, the disclosures of which are totally incorporated herein by reference; the aluminum salicylate compound Bontron E-88 available from Orient Chemical Company; the metal azo complex TRH available from Hodogaya Chemical Company; and the like.

Moreover, the toner composition can contain as internal or external components other additives, such as colloidal silicas inclusive of Aerosil, metal salts, such as titanium oxides, tin oxides, tin chlorides, and the like, metal salts of fatty acids such as zinc stearate, reference U.S. Pat. Nos. 3,590,000 and 3,900,588, the disclosures of which are totally incorporated herein by reference, and waxy components, particularly those with a molecular weight of from about 1,000 to about 15,000, and preferably from about 1,000 to about 6,000, such as polyetheylene and polypropylene, which additives are generally present in an amount of from about 0.1 to about 5 percent by weight.

The toner composition of the present invention can be prepared by a number of known methods including melt blending the toner resin particles, and pigment particles or colorants, followed by mechanical attrition. Other methods include those well known in the art such as spray drying, melt dispersion, dispersion polymerization, extrusion, and suspension polymerization; known micronization and classification of the toner can be accomplished to enable toner particles with an average diameter of from about 10 to about 25 microns.

Characteristics associated with the toner compositions of the present invention in embodiments thereof include a fusing temperature of less than about 225° to about 250° F., and a fusing temperature latitude of from about 250° to about 350° F. Moreover, it is believed that the aforementioned toners possess stable triboelectric charging values of from about 10 to about 40 microcoulombs per gram for an extended number of imaging cycles exceeding, for example, in some embodiments one million developed copies in a xerographic imaging apparatus, such as for example the Xerox Corporation 1075 TM. Although it is not desired to be limited by theory, it is believed that two important factors for the slow, or substantially no degradation in the triboelectric charging values residue in the unique physical properties of the multiblock resin selected, and moreover the stability of the carrier particles utilized. Also of importance in embodiments of the present invention is the consumption of less energy with the toner compositions since they can be fused at a lower temperature, that is about 230° F. (fuser roll set temperature) compared with other conventional toners including those containing certain styrene butadiene resins which fuse at from about 300° to about 330° F. In addition, the multiblock polymers possess in some embodiments the other important characteristics mentioned herein inclusive of a glass transition temperature of from about 24 to about 74 and preferably from about 24° to about 60° C.

As carrier particles for enabling the formulation of developer compositions when admixed in a Lodige blender, for example, with the toner, there are selected various known components including those wherein the carrier core is comprised of steel, nickel, magnetites, ferrites, copper zinc ferrites, iron, polymers, mixtures thereof, and the like. Also useful are the carrier particles as illustrated in U.S. Pat. No. 4,937,166 and 4,935,326, the disclosures of which are totally incorporated herein by reference. These carrier particles can be prepared by mixing low density porous magnetic, or magnetically attractable metal core carrier particles with from, for example, between about 0.05 percent and about 3 percent by weight, based on the weight of the coated carrier particles, of a mixture of polymers until adherence thereof to the carrier core by mechanical impaction of electrostatic attraction; heating the mixture of carrier core particles and polymers to a temperature, for example, of between from about 200° F. to about 550° F. for a period of from about 10 minutes to about 60 minutes enabling the polymers to melt and fuse to the carrier core particles, cooling the coated carrier particles; and thereafter classifying the obtained carrier particles to a desired particle size.

In a specific embodiment of the present invention, there are provided carrier particles comprised of a core with a coating thereover comprised of a mixture of a first dry polymer component and a second dry polymer component. The aforementioned carrier compositions can be comprised of known core materials including iron with a dry polymer coating invention can be generated by admixing the aforementioned carrier particles with the toner compositions comprised of the liquid glass resin particles, pigment particles, and the other additives.

Thus, a number of suitable solid core carrier materials can be selected. Characteristic carrier properties of importance include those that will enable the toner particles to acquire a positive or negative charge, and carrier cores that will permit desirable flow properties in the developer reservoir present in the xerographic imaging apparatus. Also of value with regard to the carrier core properties are, for example, suitable magnetic characteristics that will permit magnetic brush formation in magnetic brush development processes; and also wherein the carrier cores possess desirable mechanical aging characteristics. Preferred carrier cores include ferrites, and sponge iron, or steel grit with an averaged particle size diameter of from between about 30 microns to about 200 microns.

Illustrative examples of polymer coatings selected for the carrier particles include those that are not in close proximity in the triboelectric series. Specific examples of polymer mixtures selected are polyvinylidenefluoride with polyethylene; polymethylmethacrylate and copolyethylenevinylacetate; copolyvinylidene fluoride tetrafluoroethylene and polyethylene; polymethylmethacrylate and copolyethylene vinylacetate; and polymethylmethacrylate and polyvinylidene fluoride. Other coatings, such as polyvinylidene fluorides, fluorocarbon polymers including those available as FP-461, terpolymers of styrene, methacrylate, and triethoxysilane, polymethacrylates, reference U.S. Pat. Nos. 3,467,634 and 3,526,533, the disclosures of which are totally incorporated herein by reference, and not specifically mentioned herein can be selected providing the objectives of the present invention are achieved.

With further reference to the polymer coating mixture, by close proximity as used herein its meant that the choice of the polymers selected are dictated by their position in the triboelectric series, therefore, for example, one may select a first polymer with a significantly lower triboelectric charging value than the second polymer. Other known carrier coatings may be selected such as fluoropolymers like Kynar 301F; styrene terpolymers; trifluorochloroethylene/vinylacetate copolymers; polymethacrylates; and the like, at carrier coating weights of, for example, from about 0.1 to about 5 weight percent.

The carrier coating for the polymer mixture can be present in an effective amount of from about 0.1 to about 3 weight percent for example. The percentage of each polymer present in the carrier coating mixture can vary depending on the specific components selected, the coating weight, and the properties desired. Generally, the coated polymer mixtures used contain from about 10 to about 90 percent of the first polymer, and from about 90 to about 10 percent by weight of the second polymer. Preferably, there are selected mixtures of polymers with from about 30 to about 60 percent by weight of the first polymer, and from about 70 to about 40 percent by weight of a second polymer. In one embodiment of the present invention, when a high triboelectric charging value is desired, that is exceeding 30 microcoulombs per gram, there is selected from about 50 percent by weight of the first polymer such as a polyvinylidene fluoride commercially available as Kynar 301F, and 50 percent by weight of a second polymer such as polymethylacetlate or polymethylmethacrylate. In contrast, when a lower triboelectric charging value is required, less than, for example, about 10 microcoulombs per gram, there is selected from about 30 percent by weight of the first polymer, and about 70 percent by weight of the second polymer.

Generally, from about 1 part to about 5 parts by weight of toner particles are mixed with 100 parts by weight of the carrier particles illustrated herein enabling the formation of developer compositions.

Also encompasssed within the scope of the present invention are colored toner compositions comprised of toner resin particles, and as pigments or colorants, red, blue, green, brown, magenta, cyan and/or yellow particles, as well as mixtures thereof. More specifically, illustrative examples of magenta materials that may be selected as pigments include 1,9-dimethyl-substituted quinacridone and anthraquinone dye identified in the Color Index as CI 60720; CI Dispersed Red 15, a diazo dye identified in the Color Index as CI 26050; CI Solvent Red 19; and the like. Examples of cyan materials that may be used as pigments include copper tetra-4(octadecyl sulfonamido) phthalocyanine; X-copper phthalocyanine pigment listed in the Color Index as CI 74160; CI Pigment Blue; and Anthrathrene Blue, identified in the Color Index as CI 69810; Special Blue X-2137; and the like; while illustrative examples of yellow pigments that may be selected are diarylide yellow 3,3-dichlorobenzidene acetoacetanilides, a monoazo pigment identified in the Color Index as CI 12700; CI Solvent Yellow 16, a nitrophenyl amine sulfonamide identified in the Color Index as Foron Yellow SE/GLN; CI Dispersed Yellow 33, a 2,5-dimethoxy-4sulfonanilide phenylazo-4'-chloro-2,5-chloro-2,5-dimethoxy acetoacetanilide; Permanent Yellow FGL; and the like. These pigments are generally present in the toner composition in an amount of from about 1 weight percent to about 15 weight percent based on the weight of the toner resin particles.

The toner and developer compositions of the present invention may be selected for use in electrophotographic imaging processes containing therein conventional photoreceptors, including inorganic and organic photoreceptor imaging members. Examples of imaging members are selenium, selenium alloys, such as selenium tellurium, selenium arsenic, and selenium or selenium alloys containing therein additives or dopants such as halogens. Furthermore, there may be selected organic photoreceptors, illustrative examples of which include layered photoresponsive devices comprised of transport layers and photogenerating layers, reference U.S. Pat. No. 4,265,990, the disclosure of which is totally incorporated herein by reference, and other similar layered photoresponsive devices. Examples of generating layers are trigonal selenium, metal phthalocyanines, metal free phthalocyanines and vanadyl phthalocyanines. As charge transport molecules, there can be selected the aryl amines disclosed in the '900 patent. Also, there can be selected as photogenerating pigments, squaraine compounds, azo pigments, perylenes, thiapyrillium materials, and the like. These layered members are conventionally charged negatively, thus usually a positively charged toner is selected for development. Moreover, the developer compositions of the present invention are particularly useful in electrophotographic imaging processes and apparatuses wherein there is selected a moving transporting means and a moving charging means; and wherein there is selected a flexible, including a deflected, layered imaging member, reference U.S. Pat. Nos. 4,394,429 and 4,368,970, the disclosures of which are totally incorporated herein by reference. Images obtained with the developer compositions of the present invention in embodiment theory possess acceptable solids, excellent halftones and desirable line resolution with acceptable or substantially no background deposits. The toner compositions of the present invention may also be used for single component electrophotographic imaging processes and direct electrostatic printing processes.

The following examples are being supplied to further define the present invention, it being noted that these examples are intended to illustrate and not limit the scope of the present invention. Parts and percentages are by weight unless otherwise indicated.

Generally, for the preparation of toner compositions there was initially prepared the multiblock polymer. Thereafter, there are admixed with the multiblock resin polymer pigment particles and other additives by, for example melt extrusion, and the resulting toner particles are jetted and classified to enable toner particles with an average volume diameter of from about 5 to about 25 microns, and preferably with an average volume diameter of from about 7 to about 15 microns.

Preparation of the Lithium/Naphthalene Initiator:

Lithium shot (1.7 grams) packed in mineral oil (Lithcoa Corporation) was magnetically stirred with naphthalene (15 grams) in dry freshly distilled tetrahydrofuran (50 milliters) for 16 hours at 25° C. in an argon purged amber sure-seal bottle equipped with a rubber septum. The resultant dark green solution was 2 molar in concentration as determined by titration with 0.1 molar hydrochloric acid and by size exclusion chromatographic analysis of the polymeric products obtained after reaction with multiblock component monomers.

Styrene-Butadiene Polymerizations Using Lithium/Naphthalene Initiator:

Reaction vessels were typically thick walled glass beverage bottles or standard taper glass reactors equipped with magnetic stir bars and rubber septa. For example, tetrahydrofuran (300 milliliters) was added to the reaction vessel and titrated with the aforementioned lithium naphthalide initiator solution until a green color persisted for several minutes. The lithium naphthalide initiator obtained from the above process was transferred via cannula under argon to a graduated cylinder and the appropriate measured volume of initiator solution was then transferred to the reaction vessel. The reaction vessel was cooled to from about −60 to about −10° C. with a dry ice and 2-propanol slurry, and then styrene or butadiene in cyclohexane, or a mixture of both monomers were added until desired block length and molecular weight were achieved.

The number average molecular weight was calculated as follows:

$$M_n = [400 \text{ (grams of monomer)}]/[(\text{milliliters of initiator})(\text{molarity of initiator})].$$

The actual measured number average molecular weights are in substantial arrangement with the theoretically calculated values for multiblock polymer formation using the above formula The invention will now be described in detail with reference to specific preferred embodiments thereof, it being understood that these examples are intended to be illustrative only. The invention is not intended to be limited to the materials, conditions, or process parameters recited herein. Also, all parts and percentages are by weight unless otherwise indicated.

EXAMPLE I

Preparation of Multiblock Polymer I of Type 5 by the Method of Sequential Additions A five liter flask equipped with mechanical stirrer was charged with 500 milliliters of dry cyclohexane solvent, 88.2 milliliters of sec-butyllithium (1.3 molar), and then 9.07 grams of (0.057 mol) diisopropenyl benzene. The mixture was heated for 4 hours at 50° C. under an argon atmosphere. A red sediment formed that was indicative of the reactive dianion initiator, that is the product of reaction of two equivalents sec-butyllithium and one equivalent diisopropenyl benzene. The mixture was stirred for an additional 16 hours at 25° C. The mixture was cooled using a dry ice-isopropanol bath while 500 milliliters of cyclohexane and 775 milliliters of tetrahydrofuran were added before freezing occurred. The red precipitate dissolved and a solution containing 450 milliliters of styrene and 230 milliliters of butadiene in 720 milliliters of cyclohexane was added in thirteen aliquots of 100 milliliters, plus or minus 10 milliliters, each over 1 to 5 minutes at 15 minute, +/−5 minutes, intervals. The reaction mixture underwent a characteristic color change from a muddy brown to a bright red color. This distinctive color change is an indicator of the reaction progress and signals the imminent completion of a reaction interval period and prompts yet another addition interval until all scheduled additions are completed. The reaction was maintained at between −10 and −60° C. for the duration of the addition steps (4.5 hours). After stirring for 16 hours at 25° C., methanol solvent was added dropwise until the mixture became colorless. The solvent was removed on a rotary evaporator and then the concentrate was added to a slurry of dry ice in methanol contained in a Waring blender to precipitate the crude product. The colorless crude polymer was collected by filtration on a Whatman #4 paper or on a propyltex 60 micron filter cloth (available from Tetho) and washed with methanol in an amount sufficient to effect purity, about 35 milliliters, using a Waring blender. The product was then isolated by filtration and dried to constant weight amounting to a quantitative yield. The product was analyzed with gel permeation chromatography (GPC) and was found to have the following weight average and number average molecular weight properties, $M_w/M_n = 53,550/27,400$ having a trimodal distribution. The calculated number average molecular weight was $M_n = 18,900$. The weight percent of butadiene content was 25 percent (25.4 percent calculated) and the 1,2-vinyl content was 81 percent as determined by $^1H$ NMR spectrometry. A glass transition temperature at 50° C. was determined using differential scanning calorimetry (DSC).

Evaluation of Polymer I in Toner:

The minimum fix temperature of the toner with the polymer (98 weight percent) of Example I containing 6 weight percent of Regal® 330 carbon black and 2 weight percent of TP-302 charge control agent (Nachem/Hodogaya) prepared in a Banbury apparatus by melt mixing followed by jetting and classification to provide toner particles with an average diameter of 10 microns was 235° F. determined with a Xerox Corporation 5028 TM silicone fuser roll operated at 3 inches per second. Hot offset temperature was 325° F. The actual roll temperature was determined using an Omega pyrometer and was checked with was paper indicators. By comparison, the above toners with polymers of a random copolymer containing styrene and butadiene in a weight percent ratio of 89 to 11 and a polyester available from Goodyear, as disclosed in U.S. Pat. No. 3,590,000, have minimum fix temperatures at 300° F. and 230° F., respectively. Hot offset temperature for the Goodyear polyester was 275° F. and the hot offset temperature for the aforementioned random copolymer was greater than 390° F. The degree to which the developed toner image adhered to paper after fusing was evaluated for the toner with the prepared polymer of Example I using the tape test consisting of a one half by two inch strip of Scotch® brand tape which is hand pressed onto a solid developed area. The tape is rapidly removed with a continuous tearing motion. The fix level is determined by measuring the change in the optical density of the Scotch tape before and after removal from the solid developed area. The optical density measurement of the removed tape was greater than 99 percent that of the original tape indicating excellent fix properties. Other related tests to measure the level and quality of fix that provided results supporting the tape test were: the scratch test wherein ten equilibrated prints are scratched with a pointed object; the erasure test; and the crease test. The amount of toner material removed from the prints in these tests is quantitated by densitometry and was found to be 99 percent of the initial optical density, that is, less than 1 percent of the toner was removed by any of the tests.

Evaluation of Polymer I in Magnetic Toner:

A magnetic toner composition was prepared by melt blending followed by mechanical attrition containing 84 percent by weight of the multiblock polymer of Example I, and 16 percent by weight of the magnetite Mapico Black. Thereafter, the toner composition was jetted and classified resulting in toner particles with an average volume diameter of about 8 to 12 microns as measured by a Coulter Counter. A similar toner composition was prepared with the exception that it contained 74 percent by weight of the multiblock polymer of Example I, 16 percent by weight of the Mapico Black, and 10 percent by weight of Regal® 330 carbon black; and 2 percent of a charge enhancing additive of TP-302 (Nachem/Hodogaya). Thereafter, the aforementioned toner particles were classified in a Donaldson Model B classifier for the purpose of removing the particles, that is those with a volume median diameter of less than about 4 microns.

Developer compositions were then prepared by admixing 2.5 and 3.5 parts by weight of the toner compositions of Example I described above with 97.5 parts by weight of a carrier comprised of a steel core with a polymer mixture thereover containing 70 percent by weight of Kynar, a polyvinylidene fluoride, and 30 percent by weight of polymethyl methacrylate, the coating weight being about 0.9 percent. The positive triboelectric charging value of the toners as determined in the known Faraday Cage apparatus was about +20 microcoulombs per gram.

Positively charged toners were also prepared by repeating the above procedure for the preparation of magnetic toner containing a charge additive with the exception that there was included therein a percent by weight of the charge enhancing additive cetyl pyridinium chloride, instead of TP 302 and 6 percent by weight of carbon black particles.

Images were then developed using the aforementioned prepared developer compositions of the present invention of Example I in a xerographic imaging test fixture with a negatively charged layered imaging member comprised of a supporting substrate of aluminum, a photogenerating layer of trigonal selenium, and a charge transport layer of the aryl amine N,N'-diphenyl-N,N'-bis(3-methylphenyl)1,1'-diphenyl-4,4'-diamine, 45 weight percent, dispersed in 55 weight percent of the polycarbonate Makrolon, reference U.S. Pat. No. 4,265,990, the disclosure of which is totally incorporated herein by reference; and these resulted images of excellent quality with no background deposits and of high resolution for an extended number of imaging cycles exceeding, it is believed, about 75,000 imaging cycles.

Other toner compositions were prepared by repeating the above processes, thus the toner compositions described in the following examples were prepared by melt mixing, followed by mechanical attrition, jetting, and classification in accordance with the aforementioned process. The positive triboelectric charging values of these toner compositions as determined in the known Faraday Cage apparatus were from about 15 to about 21 microcoulombs per gram.

EXAMPLE II

Preparation of Multiblock Polymer II of Type 3 by One Step Addition

A five liter flask equipped with mechanical stirrer was charged with 500 milliliters of dry cyclohexane solvent, 88.2 milliliters of sec-butyl-lithium (1.3 molar), and then 9.07 grams of diisopropenyl benzene. The mixture was heated for 4 hours at 50° C. under an argon atmosphere. A red sediment formed that was indicative of the dibenzyl anion. The mixture was stirred for an additional 16 hours at 25° C. The mixture was cooled using a dry ice-isopropanol bath while 500 milliliters of cyclohexane and 775 milliliters of tetrahydrofuran were added before freezing occurred. The red precipitate dissolved and a solution containing 450 milliliters of styrene and 230 milliliters of butadiene in 710 milliliters of cyclohexane was added over 15 minutes using a cannula. The reaction mixture underwent a characteristic color change from a cloudy mud brown appearance to a bright clear red color. This color change is a good indicator of the progress of the reaction and is suggestive of the build up of high concentrations of chain termi styryl anions. The reaction was maintained at between −10 and −60° C. for the duration of the addition. After stirring for 16 hours at 25° C., methanol (50 milliliters) was added until the mixture became colorless. The aforementioned solvents were removed on a rotary evaporator and then the concentrate was added to a slurry of dry ice in methanol (2,000 milliliters) contained in a Waring blender to precipitate the crude product instantaneously. The colorless crude polymer was collected by filtration and washed in methanol using a blander. The product was then isolated by filtration and dried to constant weight a mounting to a quantitative yield, that is 100 percent conversion of reactants to the desired product multiblock polymer. The number average and weight average molecular weight as determined by GPC were 35,200 and 21,900, respectively. The weight percent of butadiene as determined by $^1$H NMR was 26.1 percent and the 1,2-vinyl content was 85.3 percent. The Tg as determined by DSC was 52.3° C.

Evaluation of Polymer II in Toner:

The minimum fix temperature of the toner with the polymer of Example II containing 6 weight percent of Regal® 330 carbon black and 2 weight percent of TP-3002 charge control agent (Nachem/Hodogaya) prepared in a Banbury apparatus by melt mixing followed by jetting and classification to provide toner particles with an average diameter of 10 microns was 245° F. determined with a Xerox Corporation 5028 TM silicone fuser roll operated at 3 inches per second. Hot offset temperature was 320° F. The actual roll temperature was determined using an Omega pyrometer and was checked with wax paper indicators. The degree to which the developed toner image adhered to paper after fusing was evaluated using the tape test. The fix level was found to be excellent.

EXAMPLE III

Preparation of the Multiblock Polymer of Type 2 by Sequential Addition Using Lithium/Naphthalene Initiator A septum capped one liter beverage bottle containing freshly distilled tetrahydrofuran (300 milliliters) and magnetic stir bar was treated with about two milliliters of the aforementioned 2 molar lithium/naphthalene initiator solution until a green color persisted for one minute. More initiator solution, typically about 30 milliliters, was added via cannula from a graduated cylinder under argon atmosphere. The reaction vessel was cooled to between −30 and −60° C. with a dry ice and isopropanol slurry, then styrene (13.5 grams, 15 millliters) that had been freshly distilled from sodium hydride was added. When 30 milliliters of the aforementioned 2 molar lithium/naphthalene initiator solution is used instead, the number average molecular weight of the initially formed polystyrene block was between 4,000 and 5,000 with a glass transition temperature of about 77° C. The reaction mixture may be either green colored, when 30 milliliters of initiator is used, or red colored, when 20 milliliters of initiator. The preferred color of the reaction mixture is red indicating the presence of the reactive or "living" polymer. After one hour, butadiene (12 grams, 20 milliliters) in about 60 milliliters of cyclohexane is added while cooling in the dry ice-isopropanol bath. Cooling to between −30 and −60° C. is preferred when reactions are performed in etheral solvents. Butadiene is dried and stored over solution hydride at −15° C. for at least 16 hours prior to use in the reaction mixtures. After yet another hour, styrene (27 grams, 30 milliliters) was added via cannula. The polymer at this stage consisted of five blocks. When 30 milliliters of initiator were used, the number average molecular weight was $M_n = 6,600$ and the glass transition temperature was about 52.7° C. The length of the multiblock polymer was increased by successive additions of monomer until the desired block sequence and molecular weight was achieved. Polymers were isolated by precipitation in methanol followed by drying in air at 25° C. to a constant weight affording the product in nearly quantitative yield based on the weight of added monomers.

The product obtained with 30 millliters of di-initiator was analyzed by GPC and was found to have the following weight average and number average molecular weight properties, $M_w/M_n = 13,200/6,560$; dispersity of 2.0. The weight percent of butadiene content was 23 percent and the 1,2-vinyl content was 94 percent as determined by $^1H$ NMR spectrometry. The glass transition temperatures was 47° C. determined using DSC. When 20 milliliters of di-initiator was used, the resultant five block polymer had a weight average molecular weight of 15.760 and number average molecular weight of 5,150. The Tg as determined by DSC was 59.9° C. The weight percent of butadiene was 14.8 percent and the 1,2-vinyl content was 68.9 percent.

Evaluation of Polymer III in Toner:

The minimum fix temperature of the toner with the polymer of Example III containing 6 weight percent of Regal® 330 carbon black and 2 weight percent of TP-302 charge control agent (Nachem/Hodogaya) prepared in a Banbury apparatus by melting mixing followed by jetting and classification to provide toner particles with an average diameter of 10 microns was 250° to 260° F. determined with a Xerox Corporation 5028 TM silicone fuser roll operated at 3 inches per second. Hot offset temperature was 330° F. The actual roll temperature was determined using an Omega pyrometer and was checked with wax paper indicators. The degree to which the developed toner image adhered to paper after fusing was evaluated using the tape test. The fix level was found to be excellent as observed for the toner of Example II.

EXAMPLE IV

Preparation of Multiblock Polymer of Type 2

A one liter beverage bottle equipped with a magnetic stir bar and rubber septum seal under an argon atmosphere was washed with 100 milliliters of dry cyclohexane and 10 milliliters of 1.3 molar sec-butyl-lithium in cyclohexane solution. The washings were decanted via cannula and the vessel was rinsed with a second 100 milliliters of dry cyclohexane, Next, the vessel was charged with 100 milliliters of dry cyclohexane, 27.9 milliliters of 1.3 molar sec-butyllithium in cyclohexane and 2.87 grams of 1,3-diisopropenyl benzene followed by heating for four hours at 50° C. with continuous stirring. An additional 100 millliters of cyclohexane were added and then the vessel was cooled to about −30° C. in a dry ice-isopropanol bath with concurrent addition of 100 milliliters of dry tetrahydrofuran. To the reaction mixture was added 13.5 grams of (15 milliliters) styrene via syringe. All monomer additions were carried out while the reaction mixture was at between −10 and −60° C. After one hour, 12 grams or 20 milliliters of butadiene in about 60 milliliters of cyclohexane were added. After another hour, 27 grams or 30 milliliters of styrene were added. After yet another hour, 12 grams or 20 milliliters of butadiene in about 60 milliliters of cyclohexane were added. Finally, after another hour elapsed the addition of 27 grams or 30 milliliters of styrene was made. The resulting mixture was allowed to stir for at least 16 hours at 25° C. The septum was removed and methanol was added to quench the reaction. Solvent was removed using a rotary evaporator and the viscous solution was added to methanol contained in a Waring blender to precipitate and then wash the polymer product. The yield of air dried polymer was 96 percent of theory. The product is a nine block styrene-butadiene polymer with a glass transition temperature of 54.7° C. determined using DSC. This polymer readily passes the various blocking tests at 51° C. without having a hydrophobic fumed silica, for example Aerosil R972 (Degussa), additive present. The glass transition temperature is not a clear transition, rather it appears as a very gradual change in the heat capacity with increasing temperature. The product was analyzed by GPC and was found to have the following weight average and number average molecular weight properties, $M_w/M_n = 21,900/12,000$; dispersity of 1.83. The weight percent of butadiene content was 21.9 percent and the 1,2-vinyl content was 94 percent as determined by $^1H$ NMR spectrometry.

Evaluation of Polymer IV in Toner:

The minimum fix temperature of the toner with the polymer of Example IV containing 6 weight percent of Regal® 330 carbon black and 2 weight percent of TP-302 charge control agent (Nachem/Hodogaya) prepared in a Banbury apparatus by melt mixing followed by jetting and classification to provide toner particles with an average diameter of 10 microns was 260° F. determined with a Xerox Corporation 5028 TM silicone fuser roll operated at 3 inches per second. Hot offset temperature was 350° F. The actual roll temperature was determined using an Omega pyrometer and was checked with wax paper indicators. The degree to which the developed toner image adhered to paper after fusing was evaluated using the tape test. The fix level was found to be excellent.

EXAMPLE V

Preparation of Polystyrene-Polybutadiene Multiblock Polymer V of Type 2

The following was added to a clean, dry one liter beverage bottle equipped with a stir bar and rubber septum; 120 milliliters of cyclohexane; 10 milliliters of 1.6 molar n-butyl-lithium and 24.1 grams of styrene; 13.2 grams of butadiene in 70 milliliters of cyclohexane after 3 hours; 23.6 grams of styrene after 6 hours; 13.69 grams of butadiene in 70 milliliters of cyclohexane after 9 hours; 24.3 grams of styrene after 6 hours; 15.2 grams of butadiene in 70 milliliters of cyclohexane after 3 hours; 24.3 grams of styrene after 6 hours; 13.6 grams of butadiene in 70 milliliters of cyclohexane after 9 hours; 24.3 grams of styrene after 6 hours; 13.2 grams of butadiene in 70 milliliters of cyclohexane after 3 hours; and finally 24.3 grams of styrene after 60 hours.

After an additional 16 hours, about 1 milliliters of methanol was added and the reaction mixture turned colorless. The reaction mixture was added to one gallon methanol to precipitate the polymer using a Waring blender. After isolation by filtration, the polymer was dried in vacuo to yield 209 grams of white powder in 99 percent yield based on the weight of the total monomers added to the reaction. The polymer has a broad glass transition temperature of between 48° and 54° C. and contained about 30 percent by weight butadiene that was comprised of about 16 percent cis, 19 percent trans and 65 percent as the 1,2-vinyl regioisomers isomers. The GPC indicated that $M_w/M_n = 37,400/23,100$.

Evaluation of Polymer V in Toner:

The minimum fix temperature of the toner with the polymer of Example V containing 6 weight percent of Regal® 330 carbon black and 2 weight percent of TP-302 charge control agent (Nachem/Hodogaya) prepared in a Banbury apparatus by melting mixing followed by jetting and classification to provide toner particles with an average diameter of 10 microns was 220° and 240° F. determined with a Xerox Corporation 5028 TM silicone fuser roll operated at 3 inches per second. Hot offset temperature was 300° F. The actual roll temperature was determined using an Omega pyrometer and was checked with wax paper indicators. The degree to which the developed toner image adhered to paper after fusing was evaluated using the tape test. The fix level was found to be excellent.

EXAMPLE VI

Preparation of Polystyrene-Polyisoprene Multiblock Polymer VI of Type 3

To a one liter berverage bottle equipped with a stir bar and rubber septum were added the following: 35 milliliters of 2 molar lithium-naphthalene initiator, 300 milliliters of tetrahydrofuran, and 15 milliliters of styrene. The following additions were then made in the quantities and time sequence indicated: 20 milliliters of (13.64 gram) distilled isoprene in 70 milliliters of cyclohexane after 75 minutes; 30 milliliters of styrene after 135 minutes; 20 milliliters of (13. 6 grams) distilled isoprene in 70 milliliters of cyclohexane after 75 minutes; and then 30 milliliters of styrene after 135 minutes. After 16 hours, 5 milliliters of methanol was added and the reaction mixture was added to one gallon methanol to precipitate the polymer using a Waring blender. The polymer was isolated by filtration and dried in vacuo to yield 92.4 grams of a white powder. The glass transition temperature of the polymer was greater than 47.2° C. The gel permeation chromatography molecular weight was $M_w/M_2 = 12,100/4,530$.

Evaluation of Polymer VI in Toner:

The minimum fix temperature of the toner with the polymer of Example VI containing 6 weight percent of Regal® 330 carbon black and 2 percent of cetyl pyridinium chloride charge control additive prepared in a Banbury apparatus by melt mixing followed by jetting and classification to provide toner particles with an average diameter of 10 microns was 240° and 250° F. determined with a Xerox Corporation 5028 TM silicone fuser roll operated at 3 inches per second. Hot offset temperature was 300° F. The actual roll temperature was determined using an Omega pyrometer and was checked with wax paper indicators. The degree to which the developed toner image adhered to paper after fusing was evaluated using the tape test. The fix level was found to be excellent. This toner had satisfactory blocking behavior at 50° C.

EXAMPLE VII

Preparation of Poly(styrene-block-butadiene)$_3$ Multiblock Polymers VII of Type 1

A twelve ounce beverage bottle equipped with a stir bar and rubber septum was purged under argon. Cyclohexane (100 milliliters), styrene (20 milliliters) and 10 milliliters of 1.6 molar n-butyl-lithium were added via syringe. After three hours, butadiene (9.4 grams) was added and the mixture turned from orange-red to a yellow color. After nine hours, styrene (20 milliliters) was added. After sixteen hours, butadiene (22.9 grams) was added. After 8 hours, styrene (20 milliliters) was added. After eight hours, butadiene (21.9 grams) was added. The viscous solution was stirred for sixteen hours and then added to methanol to precipitate a yellow insoluble residue using a Waring blender. The polymer was washed with methanol using a Waring blender and dry ice, then collected by filtration and dried under vacuum to yield 92.1 grams of a yellow powder. This material had a very broad glass transition temperature between 42° and 54° C. as measured by DSC. $^1$H and $^{13}$C NMR analyses of the product showed a 40 mol percent of styrene and 60 mol percent of butadiene content. The percent ratios of cis/trans/vinyl butadiene regioisomers were 27/43/30. The structural formula approximates the aforementioned Type 1 liquid glass resin wherein n=3.

Evaluation of Polymer VII in Toner:

The minimum fix temperature of the toner with the polymer of Example VII containing 6 weight percent of Regal® 330 carbon black and 2 percent of TP-302 charge control additive prepared in a Banbury apparatus by melt mixing followed by jetting and classification to provide toner particles with an average diameter of 10 microns was 200° F. determined with a Xerox Corporation 5028 TM silicone fuser roller operated at 3 inches per second. Hot offset temperature was 300° F. the actual roll temperature was determined using an Omega pyrometer and was checked with wax paper indicators. The degree to which the developed toner image adhered to paper after fusing was evaluated using the tape test. The fix level was found to be excellent.

EXAMPLE VIII

Preparation of Hydrogenated Poly(styrene-block-butadiene)$_3$ Multiblock Polymer VIII of Type 1

A twelve ounce beverage bottle equipped with a stir bar and rubber septum was purged under argon. Cyclohexane (100 milliliters), styrene (20 milliliters) and 20 milliliters of 1.6 molar n-butyl-lithium were added via syringe. After three hours, butadiene (12 grams) was added. After nine hours, styrene (20 milliliters) was added. After sixteen hours, butadiene (20 grams) was added. After 8 hours, styrene (20 milliliters) was added. After eight hours, butadiene (13.4 grams) was added. The viscous solution was stirred for sixteen hours and then added to methanol to precipitate a yellow insoluble residue. The polymer was washed with methanol using a Waring blender and dry ice, then collected by filtration and dried under vacuum to yield 93.8 grams of a yellow powder. This material had a very broad glass transition temperature between 31° and 47° C. as measured by DSC. $^1$H and $^{13}$C NMR analyses of the product showed a 44 mol percent of styrene and 56 mol percent of butadiene content. The percent ratios of cis/trans/vinyl butadiene regioisomers were 24/41/35. The structural formula approximates the aforementioned Type 1 liquid glass resin wherein n=3.

The above prepared polymer product (25.8 grams) was dissolved in toluene (200 milliliters) and was added to a 500 milliliters Parr pressure reaction vessel. Triphenylphosphine (5.69 grams) and tris(triphenylphosphine) rhodium chloride (1.05 grams) in toluene (50 milliliters) were then added. The vessel was purged with argon, sealed, charged with 450 psi of hydrogen gas, and then heated to 100° C. The vessel was then charged with 780 psi of hydrogen gas and stirred at 100° C. for 25 hours. The reaction mixture containing the soluble polymer was added to methanol to precipitate the crude product. The product was washed with methanol, collected by filtration and vacuum dried. The polymer was completely hydrogenated as evidenced by the absence of olefinic hydrogens in both the $^1$H NMR and FT-IR. A broad glass transition temperature near 58° C. was measured by DSC. No crystalline melting point was observed. The polymer was converted to toner by melt extrusion with 6 percent of Regal ® 330 carbon black and 2 percent of TP-302 charge control additive, followed by micronization of the extrudate. For examples of hydrogenation of polybutadiene containing polymers see Burfield et al., *Macromolecules*, 19, 2409, (1986)], the disclosure of which is totally incorporated herein by reference.

Evaluation of Polymer VIII in Toner:

The minimum fix temperature of the toner with the polymer of Example VIII containing 6 weight percent of Regal ® 330 carbon black and 2 percent by weight of TP-302 charge control additive prepared in a Banbury apparatus by melting mixing followed by jetting and classification to provide toner particles with an average diameter of 10 microns was less than 215° F. determined with a Xerox Corporation 5028 TM silicone fuser roll operated at 3 inches per second. Hot offset temperature was 300° F. The actual roll temperature was determined using an Omega pyrometer and was checked with wax paper indicators. The degree to which the developed toner image adhered to paper after fusing was evaluated using the tape test. The fix level was found to be excellent. The resulting images fixed onto paper substrates have a waxy texture. The melt rheology was $5.4 \times 10^5$ poise at 80° C. and $3.9 \times 10^3$ poise at 110° C.

EXAMPLE IX

Preparation of Polystrene-Polybutadiene Diblock Polymer IX of Type 1

A beverage bottle equipped with a stir bar and a rubber septum was purged with argon. Cyclohexane (75 milliliters), 24.1 grams of (25 milliliters) styrene; 10 milliliters of 1.6 molar n-butyl-lithium in hexanes were added via syringe. Three hours later butadiene (20 milliliters) in 50 milliliters of cyclohexane was added. After 16 hours with continuous stirring, the reaction mixture was added to methanol to precipitate the polymer. After vacuum drying, the yield of yellow polymer was 60.4 grams. The GPC $M_w/M_n$ was 28,600/6,036 with a trimodal distribution. A broad glass transition temperature was measured between 51° and 53° C. using DSC. The mol percent of butadiene and styrene was 44 and 56, respectively, as determined using 1H and 13C NMR spectrometry. The percent of cis/trans/vinyl butadiene ratios was 28/43/28. The structural formula approximates (styrene)$_{23}$-(butadiene)$_{19}$.

Evaluation of Polymer IX in Toner:

The minimum fix temperature of the toner with the polymer of Example IX containing 6 weight percent of Regal ® 330 carbon black and 2 percent of by weight TP-302 charge control additive prepared in a Banbury apparatus by melt mixing followed by jetting and classification to provide toner particles with an average diameter of 10 microns was 228° F. determined with a Xerox Corporation 5028 TM silicone fuser roll operated at 3.3 inches per second. The hot offset temperature was 250° F. The actual roll temperature was determined using an Omega pyrometer and was checked with wax paper indicators. The degree to which the developed toner image adhered to paper after fusing was evaluated using the tape test. The fix level was found to be excellent.

EXAMPLE X

Hydrogenation of poly(styrene-block-butadiene)$_{11}$ Multiblock Polymer of Type 2 from Example V Forming Polymer of Type 7

Polymer from Example V (30 grams) in toluene (200 milliliters) was combined with triphenylphosphine (6 grams) and tri-(triphenyl phosphine) rhodium chloride (1 grams, Wilkinson's Catalyst) in toluene (50 milliliters) in a 500 milliliters Parr pressure reaction vessel. The mixture was purged with hydrogen, sealed, charged to 200 psi of hydrogen, and then heated with stirring to 100° C. The hydrogen pressure was increased to 800 psi. The hydrogen pressure was maintained above 600 psi for 24 hours at 100° C. with stirring. The reaction mixture was cooled and added to methanol (1 gallon). The precipitate was washed with water, acidic methanol, water, and then methanol. The precipitate was collected by filtration, and vacuum dried to yield 30.3 grams of brown powder. The polymer was about 78 percent hydrogenated; 95 percent of the 1,2-vinyl double bond isomer groups and 54 percent of the 1,4 isomer were reduced. The glass transition temperature measured using DSC was 52° C. The polymer was made into toner by melt extrusion with 6 percent of Regal ® 330 and 2 percent of TP-302 followed by micronization. The MFT was 230° F. and the hot offset temperature was between 280° and 300° F.

EXAMPLE XI

Preparation of Polystyrene-block-polybutadiene Copolymer XI of Type 1

A 6.5 ounce beverage bottle was equipped with a stir bar and a rubber septum. After purging with argon, cyclohexane (100 milliliters), styrene (30 milliliters), and then 10 milliliters of 1.6 molar n-butyl-lithium in hexanes were added via syringe. After 3.5 hours, butadiene was added until the weight of the reaction mixture increased by 9 grams. After 16 hours stirring, the mixture was added to methanol to precipitate the polymer using a Waring blender. The polymer was collected by filtration and vacuum dried. The DSC glass transition temperature was 44° C. The GPC $M_w/M_n$ was 14,600/6,700. $^{13}$C and $^1$H NMR analysis showed 73 percent mol percent of styrene and 27 percent mol percent of butadiene. The cis/trans/vinyl butadiene ratios were 27/50/23. The structural formula approximates (styrene)$_{38}$-(butadiene)$_{14}$. The minimum fix temperature of a toner with the above polymer and with 6 percent of Regal ® 330 and 2 percent of TP-302 was between 240° and 250° F., using a Xerox Corporation 5028 TM silicone soft roll fuser operated at 3.3 inches per second. The hot offset temperature was 300° F.

EXAMPLE XII

Preparation of Carboxy Tipped
Polystyrene-block-polybutadiene Copolymer XII of
Type 6

A beverage bottle equipped with a stir bar and a rubber septum was purged with argon. Cyclohexane (100 milliliters), styrene (30 milliliters), and then 10 milliliters of 1.6 molar n-butyl-lithium in hexanes were added via syringe. After 5 hours, butadiene (20 milliliters) in cyclohexane was added. After 16 hours, the mixture was poured over dry ice in a glove bag under argon. The colorless product was washed with dilute hydrochloric acid, water, and methanol using a Waring blender. The polymer was collected by filtration and vacuum dried. The yield was 36.0 grams or 84 percent theory. The DSC glass transition temperature was 65.8° C. The polymer was made into toner by melt extrusion with 6 percent of Regal ® 330 carbon black and 2 percent of TP-302 followed by micronization. The minimum fix temperature of the toner was 250° F. and the hot offset temperature was 331° F. using a Xerox Corporation 5028 TM silicone soft roll fuser operated at 3.3 inches per second.

EXAMPLE XIII

Preparation of Carboxy Tipped
Polystyrene-block-polybutadiene Copolymer XIII of
Type 6

A 16 ounce beverage bottle equipped with a stir bar and a rubber septum was purged with argon. Cyclohexane (200 milliliters) and 10 milliliters of 1.6 molar n-butyl-lithium in hexanes were added via syringe. Styrene (25 milliliters) was added rapidly. After 16 hours, butadiene (40 milliliters) was added and stirring at 25° C. was continued for 8 hours. The mixture was poured onto dry ice (230 grams) in a glove bag under argon. The mixture was added to methanol, washed with dilute hydrochloric acid, water, and then methanol using a Waring blender. The yield of vacuum dried polymer was 50.9 grams. The PGC $M_w/M_n$ was 19,445/7,702. The glass transition temperature was 65.8° C.

Evaluation of Polymer XIII in Toner:

The minimum fix temperature of the toner with the polymer of Example XIII containing 6 weight percent of Regal ® 330 carbon black and 2 percent of TP-302 charge control additive prepared in a Banbury apparatus by melt mixing followed by jetting and classification to provide toner particles with an average diameter of 10 microns was less than 280° F. determined with a Xerox Corporation 5028 TM silicone fuser roll operated at 3 inches per second. Hot offset temperature was 380° F. The actual roll temperature was determined using an Omega pyrometer and was checked with wax paper indicators. The degree to which the developed toner image adhered to paper after fusing was evaluated using the tape test. The fix level was found to be excellent.

EXAMPLE XIV

Hydrogenation of Carboxy Tipped
Polystyrene-block-polybutadiene Copolymer Forming
Polymer XIV of Type 7

Triphenyl phosphine (7 grams) and 0.9 gram tris-(triphenyl phosphine) rhodium chloride (0.9) in toluene (200 milliliters) were added to the polymer (50 grams) of Example XIII in a Parr pressure reaction vessel (500 milliliters capacity). The vessel was purged with nitrogen, sealed, charged to 450 psi with hydrogen and heated to 100° C. The hydrogen pressure was increased to 1000 psi and stirring at 100° C. was continued for 33 hours. The mixture was added to methanol to precipitate the polymer using a Waring blender. After vacuum drying, the collected polymer was 38.8 g. The glass transition temperature was 86.6° C. determined using DSC. The product was 98.8 percent hydrogenated as determined using FTIR, $^{13}C$ and $^1H$ NMR spectrometry.

Evaluation of Polymer XIV in Toner

The minimum fix temperature of the toner with the polymer of Example XIV containing 6 weight percent of Regal ® 330 carbon black and 2 percent of TP-302 charge control additive prepared in a Banbury apparatus by melt mixing followed by jetting and classification to provide toner particles with an average diameter of 10 microns was less than 350° F. determined with a Xerox Corporation 5028 TM silicone fuser roll operated at 3 inches per second. Hot offset temperature was 370° F. The actual roll temperature was determined using an Omega pyrometer and was checked with wax paper indicators. The degree to which the developed toner image adhered to paper after fusing was evaluated using the tape test. The fix level was found to be excellent.

EXAMPLE XV

Hydrogenation of Carboxy Tipped
polystyrene-block-polybutadiene Copolymer of
Example XII of Type 7

Hydrogenation of the polymer resulting from Example XII (20 grams) was carried out in a Parr pressure reaction vessel (500 milliliters) as described in Example XIV in 250 milliliters of toluene with triphenyl phosphine (5 grams) and tris-(triphenyl phosphine)rhodium chloride (0.8 grams). The hydrogen pressure of 1,000 psi was maintained for 24 hours at 100° C. with stirring. After the reaction mixture was added to methanol using a Waring Blender, the precipitated polymer was collected by filtration and dried in vacuo. The yield was 19.7 grams. The glass transition temperature was 84.6° C. determined by DSC.

Evaluation of polymer XIV in Toner:

The minimum fix temperature of the toner with the polymer of Example XIV containing 6 weight percent of Regal ® 330 carbon black and 2 percent of TP-302 charge control additive prepared in a Banbury apparatus by melt mixing followed by jetting and classification to provide toner particles with an average diameter of 10 microns was less than 350° F. determined with a Xerox Corporation 5028 TM silicone fuser roll operated at 3 inches per second. Hot offset temperature was 370° F. The actual roll temperature was determined using an Omega pyrometer and was checked with wax paper indicators. The degree to which the developed toner image adhered to paper after fusing was evaluated using the tape test. The fix level was found to be excellent.

EXAMPLE XVI

Preparation of Polystyrene-Polybutadiene Multiblock
Polymer XVI of Type 2 Containing High 1,4-butadiene
Content A one liter beverage bottle equipped with a stir bar and a rubber septum was purged with argon. Cyclohexane (100 milliliters), 2.10 grams of diisopropenyl benzene (13.3 mmol) and 20 milliliters of 1.3 molar sec-butyl-lithium in hexanes were added via syringe. The mixture was heated for 4 hours at 50° C. To this was added at 25° C. 20 milliliters of butadiene in 100 milliliters of cyclohexane. One hour later, the reaction mixture was heated in a sealed bottle at 50° C. for one hour. An additional 20 milliliters of butadiene in 100 milliliters of cyclohexane were added at 25° C. and then one hour later the mixture was heated for one hour at 50° C. Styrene (87 milliliters) was added and the reaction mixture was heated for four hours at 50° C. After 16 hours at 25° C. with stirring, methanol was added to quench the reaction and the contents of the bottle were poured into methanol (2 liters) to precipitate a white polymer. After washing the polymer with methanol followed by vacuum drying, the yield was 105 grams. The weight percent of butadiene was 22.7 and the vinyl content was 16.9 percent as determined by $^1$H NMR spectometry. The glass transition temperature was 55° C. as determined by DSC. The poor definition of the glass transition temperature observed may be a consequence of an averaging of the interactions between individual polystyrene block segments in the overall system. That is, the glassy styrene block domains are suffiently small and sufficiently well articulated or spaced by the liquid component domains as to preclude macroscopic phase separation. The GPC weight and number average molecular weights were 29,800 and 13,500, respectively. The minimum fix temperature of the toner with the polymer containing 6 percent of Regal ® 330 carbon black and 2 percent by weight of TP-302 charge control additive was 260° F. The hot offset temperature was 330° F. The actual roll temperature was determined using an Omega pyrometer and was checked with wax paper indicators. The degree to which the developed toner image adhered to paper after fusing was evaluated using the tape test. The fix level was found to be excellent.

EXAMPLE XVII

Preparation of Polystyrene-Polybutadiene Multiblock Polymer XVII of Type 2

A one liter beverage bottle equipped with a magnetic stir bar and a rubber septum was purged with argon. Freshly distilled THF (300 milliliters) was added followed by 15 milliliters of 1.8 molar lithium/naphthalene in THF. The reaction solution was cooled between −60 and −20° C. using dry ice-isopropanol during monomer additions. Butadiene (5 milliliters, 3.3 grams) in cyclohexane (70 milliliters) was added. After 2 hours, styrene (15 milliliters, 13.7 grams) was added. After two more hours, styrene (15 milliliters, 13.9 grams) was added. After another hour, butadiene (22 milliliters, 7.1 grams) in cyclohexane (15 milliliters, 13.9 grams) was added, and then after two more hours, styrene (15 milliliters, 13.8 grams) was added. Stirring at 25° C. was continued for 16 hours. The mixture was quenched with methanol (35 milliliters) and then was added to methanol (2 liters) and cooled with dry ice to precipitate the polymer using a Waring blender. The polymer was collected by filtration, washed with methanol and vacuum dried. After reprecipitation from 20 weight percent of polymer in methylene chloride, a white product was collected by filtration and vacuum dried to yield 50.7 grams (95 percent theory). The glass transition temperature was 51.8° C. determined by DSC and the GPC $M_w/M_n$ was 11,900/7,970. The polymer was made into toner by extrusion with 6 weight percent of Regal ® 330 carbon black and 1.5 percent of TP-302 charge control agent (Nachem/Hodogaya) followed by micronization. The minimum fix temperature was 260° F. and the hot offset temperature was 350° F. using a Xerox Corporation 5028 TM silicone roll fuser operated at 3.3 inches per second.

EXAMPLE XVIII

Preparation of Polystyrene-Polybutadiene Multiblock Polymer XVIII of Type 5

A twelve liter flask equipped with a mechanical stirrer, two rubber septa and an argon needle inlet was charged with 1,500 milliliters of dry cyclohexane, 264 milliliters of sec-butyl-lithium (1.3 molar in cyclohexane) and then 27.2 grams of diisopropenyl benzene. The mixture was heated 4 hours at 50° C. and then stirred 16 hours at 25° C. under argon. The mixture was cooled to −20° C. using a dry ice/isopropanol bath while 1,500 milliliters of cyclohexane and 2,325 milliliters of tetrahydrofuran were added before freezing occurred. A solution of 1,350 milliliters of styrene and 690 milliliters of butadiene in 1,350 milliliters of cyclohexane were added in five equal volume aliquots over five minute intervals. The reaction was maintained between −10 and −60° C. for the duration of the monomer additions. After 2 hours at −20° C., stirring at 25° C. was continued for 16 hours. Methanol (100 milliliters) was then added dropwise and the mixture became colorless. The solution was added to 5 gallons of methanol, cooled with dry ice to precipitate the polymer and washed with stirring in portions in a Waring blender. The polymer was collected by filtration and vacuum dried. A 20 percent by weight solution of the polymer in methylene chloride was added to 5 gallons of isopropanol. The white solids collected by filtration were then washed with methanol (1 gallon), filtered, and vacuum dried. The polymer (1,511 grams) was isolated in 91 percent yield. The GPC $M_w/M_n$ ratio was 32,300/20,500. The weight percent of butadiene was 28.6 and the 1,2vinyl content was 86.1 percent as determined by $^1$H NMR spectrometry. A glass transition temperature at 45.5° C. was determined using DSC.

EXAMPLE XIX

Chlorination of Polystyrene-Polybutadiene Multiblock Polymer XVIII. Preparation of Multiblock Polymer XIX of Type 8

In an evacuated one liter beverage bottle equipped with a rubber septum and stir bar was added ten grams of polymer XVIII in carbon tetrachloride (100 grams). The solution was treated with 900 milliliters (0.04 mol, 2.6 grams) of chlorine gas introduced into the solution via cannula. After one hour, methanol (500 milliliters) was added to the reaction mixture to precipitate a white product. After filtration and vacuum drying, the resultant polymer had two glass transition temperatures at 50° and 72° C. as determined by DSC. The area under the 72° C. glass transition was approximately one-third the area under the 52° C. transition. When the same reaction was repeated using 450 milliliters of (0.02 mol, 1.3 grams) chlorine gas under the same conditions, a polymer product was obtained with a glass transition temperature at 50° C. The minimum fix temperature of this polymer as toner by extrusion with 6 weight percent of Regal ® 330 carbon black and 2 percent of cetyl pyridinium chloride charge control agent was 240° F. and the hot offset temperature was 290° F. with a Xerox

EXAMPLE XX

Preparation of Multiblock Polymer XX of Type 4

In a one liter beverage bottle equipped with a rubber septum, argon inlet and magnetic stir bar was added dry tetrahydrofuran (150 milliliters) and then the reactor was titrated dropwise with a solution of the aforementioned lithium/naphthalene catalyst (1.4 molar) until the green color persisted for several seconds. An additional 11.1 milliliters of the catalyst solution was added. The reactor was cooled to between −20° and −60° C., and butadiene (11 milliliters) in 30 milliliters of tetrahydrofuran and 70 milliliters of cyclohexane was added over 3 minutes. After one hour at between −20° and −30° C., a solution of styrene (100 milliliters, 89.6 grams), butadiene (46 milliliters, 28.7 grams), cyclohexane (280 milliliters), and tetrahydrofuran (120 milliliters) was added over 12 minutes. The reaction temperature was maintained at between −20° and −30° C. for 2 hours and then 25° C. for 16 hours. Methanol (10 milliliters) was added and the reaction mixture became colorless. The mixture was added to isopropanol (2 liters) in a Waring blender to precipitate the polymer. The polymer was then washed with methanol (1 liter). A 20 percent weight solution of the polymer in methylene chloride was added to 2 liters of isopropanol to re-precipitate a white powder. The polymer was again washed with 1 liter of methanol, filtered and vacuum dried. The yield of dry polymer was 95 percent. The DSC glass transition temperature was 50° C. The GPC number and weight average molecular weights were 63,000 and 33,000, respectively. The weight percent of butadiene was 25 with 87 percent of 1,2-vinyl regioisomer. The minimum fix temperature of the toner with the above polymer by extrusion with 6 weight percent of Regal ® 330 carbon black and 2 percent of cetyl pyridinium chloride charge control agent was 260° C. and the hot offset temperature was 310° C. as determined with a Xerox Corporation 5028 TM silicone fuser operated at 3.3 inches per second.

EXAMPLE XXI

Preparation of Polystyrene-Polybutadiene Multiblock Polymer XXI of Type 3

A twelve liter three-necked flask equipped with a mechanical stirrer, two rubber septa and an argon needle inlet was charged with 1,500 milliliters of dry cyclohexane, 264 milliliters of sec-butyl-lithium (1.3 molar in cyclohexane) and then 27.2 grams of diisopropenyl benzene initiator. The mixture was heated 4 hours at 50° C. and then stirred 16 hours at 25° C. under argon. Cyclohexane (1,500 milliliters) and tetrahydrofuran (2,200 milliliters) were added with cooling to between −30° and −10° C. in a dry ice-isopropanol bath. A solution of 1,222.5 milliliters of styrene and 414.8 grams of butadiene in 1,045 milliliters of cyclohexane was added in five equal volume aliquots over ten to fifteen minute at one hour intervals. The reaction was maintained between −10° and −30° C. for the duration of the monomer additions. After 2 hours at between 0° to −20° C., stirring at 25° C. was continued for 14.5 hours. The reaction mixture was again cooled to −20° C. and 110.3 grams of styrene were added. Stirring at 25° C. was continued for 24 hours. Methanol (100 milliliters) was then added dropwise and the mixture became colorless. The reaction mixture was added to 5 gallons of methanol to precipitate the polymer and washed with stirring in portions in a Waring blender. The polymer was collected by filtration and vacuum dried. A 20 percent by weight solution of the polymer in methylene chloride was added to 5 gallons of isopropanol using a 10 gallon Kady mill. The white solids collected by filtration were then washed with methanol (1 gallon), filtered, and vacuum dried. The polymer (1,538 grams) was isolated in 88 percent yield. The mid-point glass transition temperature at 54.3° C. was determined using DSC. The GPC $M_w/M_n$ ratio was 39,300/27,500. The weight percent of butadiene was 23 and the 1,2-vinyl regioisomer content was 80 percent as determined by $^1$H NMR spectrometry.

EXAMPLE XXII

Carbon Black Toner

The polymer (46 grams) of Example XXI was extruded with a ZSK extruder between 110° and 120° F. with 3 grams of Regal ® 330 carbon black and 1 gram of cetyl pyridinium chloride charge control agent. After micronization to 10 micron particles by jetting, the glass transition temperature of the resultant toner was 55.4° C. The minimum fix temperature of the toner was 130° C. (+/−3° C.) with a standard Xerox Corporation 1075 TM fusing fixture operated at 11 to 11.5 inches per second. For the same toner fused using a standard Xerox Corporation fusing fixture operated at 3 to 3.3 inches per second, the minimum fix temperature was 125° F. The hot offset temperature for both the above tests was 153° C.

EXAMPLE XXIII

Cyan Toner

The polymer (50 grams) of Example XXI with 2 percent by weight of PV Fast Blue pigment and 2 percent by weight of cetyl pyridinium chloride charge control agent was melt mixed in a Brabender Plastigraph for 30 minutes at 70° C. and then 30 minutes at 130° C. The resultant plastic was jetted into toner and combined with Xerox Corporation 1075 TM carrier (steel coated with polyvinyl fluoride) at 3.3 weight percent of toner concentration. A tribocharge value of 21 microcoulombs per gram with 2.98 percent of toner concentration was measured with a standard Faraday cage blow-off apparatus. Images were developed on Hammermill laser printer paper and Xerox Corporation transparency stock. The DSC glass transition temperature was 52.3° C. The minimum fix temperature was 125° C. and the hot offset temperature was 154° F. with a Xerox Corporation 5028 TM silicone roll fuser operated at 3 inches per second. Excellent fused images suited to transparency projection were obtained on a transparency between 265° and 330° F. There was no visible offset of toner to the fuser roll at roll temperatures less than 335° F. Optimal projection efficiency was obtained by fusing at approximately 310° F. A gloss number of 50 was measured by fusing at 275° F.

EXAMPLE XXIV

Magneta Toner

The polymer (50 grams) of Example XXI with 5 percent by weight of Hostaperm Pink E pigment and 2 percent of weight cetyl pyridinium chloride charge control agent was melt mixed in a Brabender Plastigraph for 30 minutes at 70° C. and then 30 minutes at 130° C. The resultant plastic was jetted into toner and combined with Xerox Corporation 1075 TM carrier at 3.3 weight percent of toner concentration. A tribocharge value of 30 microcoulombs per gram with 3.04 percent of toner concentration was measured with a standard Faraday Cage blow-off apparatus. The minimum fix temperature was 125° C. The pigment dispersion was satisfactory. The projection efficiency and gloss values measured were comparable to those of Example XXIII. A gloss value 50 was achieved at 277° F. Projectable fused images on transparency stock were obtained between 265° and 333° F. An improved dispersion of Hostaperm Pink in the toner was achieved by preparing a polymer dispersion as follows. A master batch of the polymer from Example XXI and Hostaperm Pink E in an equal weight ratio was heated in a Brabender Plastigraph at 130° C. for 30 minutes and then 70° C. for 30 minutes. Another sample of the polymer from Example XXI (44 grams), 1 gram of cetyl pyridinium chloride charge control agent and five grams of the aforementioned master batch pigment polymer dispersion were melt mixed in a Brabender Plastigraph for 20 minutes at 130° C. with a shear rate of 120 to 160 rpm, and then 20 minutes at 70° C. The resultant plastic was jetted into toner. Excellent pigment dispersion was achieved and improved transparency projection efficiency was observed with toner images fused at 270° F.

EXAMPLE XXV

Preparation of Multiblock Polymer XXV of Type 2 with High 1,4-Regioisomer Butadiene Content In a one liter beverage bottle equipped with a rubber septum, argon inlet and magnetic stir bar was added dry cyclohexane (100 milliliters), n-butyl-lithium (11 milliliters, 1.3 molar) and then diisopropenyl benzene (1.15 grams). After four hours, cyclohexane (200 milliliters) was added. Styrene (15 milliliters) was added and the mixture was heated one hour at 50° C. Butadiene (20 milliliters) in 80 milliliters of cyclohexane was then added and heated at 50° C. for 2 additional hours. Styrene (30 milliliters) and stirring at 50° C. was continued for 6 hours. After 16 hours at 25° C., methanol was added and the mixture became colorless. The mixture was then poured into methanol (2 liters) to precipitate the polymer using a Waring Blender. Dry ice was used to cool the methanol and to harden the polymer to facilitate the work-up. After three washings with methanol (500 milliliters each), the colorless polymer was isolated by filtration and vacuum dried. The glass transition temperature was 38° C. by DSC. The GPC weight and number average molecular weight was 26,350 and 14,150, respectively. The weight percent of butadiene was 20.5 with 15.9 percent of 1,2-vinyl regioisomer. The five block polymer had a minimum fix temperature as toner by extrusion with 6 weight percent of Regal ® 330 carbon black and 2 percent of TP-302 charge control agent at 235° F. and a hot offset temperature of 330° F.

EXAMPLE XXVI

Preparation of Multiblock Polymer XXVI of Type 2 with light 1,4-Butadiene Regioisomer Content—Proximal and Distal to the Initiator In a one liter beverage bottle equipped with a rubber septum, argon inlet and magnetic stir bar was added dry cyclohexane (100 milliliters), sec-butyl-lithium (13 milliliters, 1.3 molar) and then diisopropenyl benzene (1.34 grams) then heated to 50° C. for four hours. Cyclohexane (200 milliliters) was added. Styrene (15 milliliters) was added and the mixture was heated one hour at 50° C. Butadiene (20 milliliters) in 80 milliliters of cyclohexane was then added and heated at 50° C. for 1 additional hour. After 16 hours at 25° C., styrene (30 milliliters) was added and the mixture maintained at 50° C. for 1 hour. Tetrahydrofuran (100 milliliters) was then added to the reaction at 25° C. More butadiene (20 milliliters) in 80 milliliters of cyclohexane was added at 25° C. After another hour, styrene (30 milliliters) was added at 25° C. and the reaction was stirred for at least 16 hours. Methanol (20 milliliters) was added and the mixture became colorless. The mixture was then poured into methanol (2 liters) to precipitate the polymer using a Waring blender. After filtration and vacuum drying, a white powder (84.4 grams) was obtained. The weight percent of butadiene was 21.1 with 52.2 percent of 1,2-vinyl regioisomer as determined by $^1$H NMR spectrometry. The GPC weight and number average molecular weight was 26,900 and 14,700, respectively. The polymer glass transition temperature was 40° C. as determined by DSC. The minimum fix temperature of toner formulated with the above prepared polymer (92 weight percent) by extrusion with 6 weight percent of Regal ® 330 carbon black and 2 percent of TP-302 charge control agent was 230° F. and the hot offset temperature of the toner was 330° F. as determined with a Xerox Corporation 5028 TM silicone fuser operated at 3.3 inches per second.

The micronization of the toners included a classification thereafter by known methods, such as in a Donaldson Classifier Other modifications of the present invention may occur to those skilled in the art subsequent to a review of the present application, and these modifications are intended to be included within the scope of the present invention.

What is claimed is:

1. Multiblock polymers of the formula $(A-B)_n$ wherein A and B represent polymer segments, and n is at least 2 and represents the number of polymer segments.

2. Multiblock polymers of the formula $(A-B)_n$ wherein A represents a glassy polymer segment, B represents a liquid polymer segment, and n is at least 2 and represents the number of polymer segments.

3. A multiblock polymer in accordance with claim 2 wherein n is a number of from 2 to about 1,000.

4. A multiblock polymer in accordance with claim 2 wherein there are present at least two A segments.

5. A multiblock polymer in accordance with claim 2 wherein A is polystyrene, and B is polybutadiene.

6. A multiblock polymer of the formula $(A-B)_n$ wherein A is a graded segmented polystyrene-polybutadiene copolymer.

7. A multiblock polymer in accordance with claim 2 wherein B is a tactic poly 1,2-butadiene.

8. A multiblock polymer in accordance with claim 2, wherein B is cis and trans poly 1,4-butadiene.

9. A multiblock polymer in accordance with claim 2 wherein B is hydrogenated cis, trans or 1,2-vinyl polybutadiene.

10. A multi-segmented block polymer in accordance with claim 2 wherein the multiblock polymer is carboxy and hydroxy terminated.

11. A multi-segmented block polymer in accordance with claim 2 wherein B is poly(cyclooctene) or hydrogenated poly(cyclooctene).

12. A multiblock polymer in accordance with claim 12 wherein B is comprised of short segments of polyethylene.

13. A multiblock polymer in accordance with claim 2 wherein B is polyisoprene or hydrogenated polyisoprene.

14. A toner composition comprised of multiblock copolymer resin particles with a glass transition temperature of between from about 20° C. to about 65° C., and pigment particles.

15. A toner composition comprised of liquid glass resin particles with a glass transition temperature of between from about 20° C. to about 65° C., and pigment particles.

16. Multiblock polymers of the formula $(A-B)_n-A$ wherein n is a number of from 2 to about 100, and wherein both ends of the polymer chain are terminated with a glassy component A, and wherein A is polystyrene, and B is polybutadiene.

17. Multiblock polymers of the formula $[A-(C)_n-]_p-D$ wherein n is a number of from 1 to about 50, p is a number of from 1 to 4 and represents the number of arms that extend radially, D is the point of initiation, and wherein A is polystyrene and C is a multiblock polymer of poly(styrene-butadiene).

18. Multiblock polymers of the formula $[A-(C)_n-(B)_m-]_p-D$ wherein n is a number of from 2 to about 50, m is a number of from 1 to about 25, and p is a number of from 1 to 4; and wherein A is polystyrene, B is polybutadiene, and C is a multiblock polymer of poly(styrene-butadiene).

19. A multiblock polymers of the formula $[A-\{-(C)_n-(B)_m-\}_q-]_p-D$ wherein n is a number of from 2 to about 50, m is a number of from 1 to about 25, q is a number from 1 to 50, and p is a number of from 1 to 4; and wherein A is polystrene, B is polybutadiene, and C is a multiblock polymer of poly(styrene-butadiene).

20. Multiblock polymers of the formula Y—Z—Y wherein Y is an ionizable radical on both ends of the polymer chain, and Z is a multiblock copolymer.

21. Multiblock polymers of the formula Z—Y wherein Y is an ionizable group on the end of the polymer chain, and Z is a multiblock copolymer.

22. A multiblock polymer in accordance with claim 2 wherein B is chlorinated cis, trans and 1,2-vinyl polybutadiene.

23. A multiblock polymer in accordance with claim 2 wherein B is poly(cyclooctene) or chlorinated poly(cyclooctene).

24. A multiblock polymer in accordance with claim 2 wherein B is polyisoprene or chlorinated polyisoprene.

* * * * *